US009432653B2

(12) United States Patent
Pourbigharaz

(10) Patent No.: US 9,432,653 B2
(45) Date of Patent: Aug. 30, 2016

(54) ORIENTATION-BASED 3D IMAGE DISPLAY

(75) Inventor: Fariborz Pourbigharaz, Thornhill (CA)

(73) Assignee: QUALCOMM Incorporated, San Diego, CA (US)

(*) Notice: Subject to any disclaimer, the term of this patent is extended or adjusted under 35 U.S.C. 154(b) by 854 days.

(21) Appl. No.: 13/291,013

(22) Filed: Nov. 7, 2011

(65) Prior Publication Data

US 2013/0113783 A1 May 9, 2013

(51) Int. Cl.
*G06T 15/00* (2011.01)
*G09G 5/00* (2006.01)
*G06K 9/00* (2006.01)
*G06K 9/36* (2006.01)
*G06K 9/32* (2006.01)
(Continued)

(52) U.S. Cl.
CPC ...... *H04N 13/0029* (2013.01); *G02B 27/2214* (2013.01); *G06T 3/4038* (2013.01); *G06T 3/606* (2013.01); *G06T 7/0075* (2013.01); *G06T 11/60* (2013.01); *G06T 19/00* (2013.01); *G09G 5/14* (2013.01); *H04N 13/0409* (2013.01); *H04N 21/41407* (2013.01); *H04N 21/42202* (2013.01); *H04N 21/440272* (2013.01); *H04N 21/816* (2013.01)

(58) Field of Classification Search
CPC ..... G06T 19/00; G06T 15/20; G06T 7/0075; G06T 3/4038; G06T 3/606; G09G 5/14; G09G 2340/0492; G02B 27/2214; H04N 13/0239
USPC ............... 345/419, 427, 581, 619, 629, 634, 345/649–659; 382/154, 284, 293, 296, 297; 359/462–477; 349/15; 348/42–60
See application file for complete search history.

(56) References Cited

U.S. PATENT DOCUMENTS 5,574,836 A * 11/1996 Broemmelsiek ............. 345/427
7,372,629 B2    5/2008 Uehara et al.
(Continued)

FOREIGN PATENT DOCUMENTS

EP    1113369 A1    7/2001
EP    1662808 A1    5/2006
(Continued)

OTHER PUBLICATIONS

International Search Report and Written Opinion—PCT/US2012/057505—ISA/EPO—Mar. 11, 2013, 14 pp.
(Continued)

*Primary Examiner* — Ke Xiao
*Assistant Examiner* — Andrew Shin
(74) *Attorney, Agent, or Firm* — Shumaker & Sieffert, P.A.

(57) ABSTRACT

This disclosure describes a host controller configured to combine image data associated with left and right images of a 3D image to control a display consistent with an orientation for the display (e.g., a first and second plurality of active parallax barriers of the display). In response to an orientation for the display, the host controller may combine image data associated with respective left and right images of with a 3D image in a first or second interleaved format to be consistent with the orientation for the display. For example, the host controller may combine the image data to be line-interleaved or pixel interleaved, based on an orientation for the display. In this manner, the display may receive the combined image data and present the 3D image consistent with the orientation for the display, while reducing processing performed by the display to present the 3D image.

29 Claims, 9 Drawing Sheets

(51) Int. Cl.

| | | |
|---|---|---|
| G02B 27/22 | (2006.01) | |
| G02F 1/1335 | (2006.01) | |
| H04N 13/04 | (2006.01) | |
| H04N 13/00 | (2006.01) | |
| G06T 11/60 | (2006.01) | |
| G06T 3/40 | (2006.01) | |
| G06T 3/60 | (2006.01) | |
| G06T 7/00 | (2006.01) | |
| G09G 5/14 | (2006.01) | |
| G06T 19/00 | (2011.01) | |
| H04N 21/414 | (2011.01) | |
| H04N 21/422 | (2011.01) | |
| H04N 21/4402 | (2011.01) | |
| H04N 21/81 | (2011.01) | |

(56) References Cited

U.S. PATENT DOCUMENTS

| | | | |
|---|---|---|---|
| 8,373,617 B2 | 2/2013 | Kim et al. | |
| 2006/0126177 A1 | 6/2006 | Kim et al. | |
| 2006/0192746 A1* | 8/2006 | Ioki et al. | 345/102 |
| 2010/0189413 A1 | 7/2010 | Yoshino | |
| 2011/0001803 A1 | 1/2011 | De Zwart et al. | |
| 2011/0181694 A1* | 7/2011 | Kim et al. | 348/43 |
| 2011/0242103 A1* | 10/2011 | Han | H04N 13/0022 345/419 |
| 2012/0050857 A1* | 3/2012 | Lee et al. | 359/464 |
| 2012/0062565 A1* | 3/2012 | Fuchs et al. | 345/419 |
| 2013/0027386 A1* | 1/2013 | Small | 345/419 |

FOREIGN PATENT DOCUMENTS

| | | |
|---|---|---|
| EP | 1784026 A1 | 5/2007 |
| GB | 2415850 A | 1/2006 |
| JP | 2006154809 A | 6/2006 |
| JP | 2010175643 A | 8/2010 |
| JP | 2011175267 A | 9/2011 |
| KR | 20060060102 A | 6/2006 |
| KR | 20110111605 A | 10/2011 |
| WO | 2011034219 A1 | 3/2011 |
| WO | 2011101289 A1 | 8/2011 |

OTHER PUBLICATIONS

Response to Written Opinion dated Mar. 11, 2013, from International application No. PCT/US2012/057505, filed Sep. 6, 2013, 12 pp.

Nam et al., "7.3: Auto-Stereoscopic Swing 3D Display," SID International Symposium, vol. 36, n. 1, p. 94-97, May 2005.

* cited by examiner

ORIENTATION-BASED 3D IMAGE DISPLAY

TECHNICAL FIELD

This disclosure relates to controlling a display to present three-dimensional (3D) imagery.

BACKGROUND

To present a 3D image to a viewer, slightly different images may be directed to a viewer's right and left eyes, respectively. The differences between an image presented to the viewer's right eye (right image) and an image presented to the viewer's left eye may cause the viewer to perceive depth in a displayed image such that the image appears substantially as a 3D image to the viewer. Stereoscopic or auto-stereoscopic techniques may be used to present 3D images to a viewer.

According to stereoscopic techniques, a viewer may wear specialized glasses that cause right and left images of a 3D image to be directed to the viewer's respective right and left eyes. According to auto-stereoscopic techniques, the display itself may be configured to cause right and left images of a 3D image to be directed to the viewer's respective right and left eyes, such that specialized glasses are not needed.

According to one example of an auto-stereoscopic technique, a display includes a plurality of parallax barriers at a screen of the display that cause right and left images to be directed to a viewer's respective right and left eyes, so long as the viewer is within a certain distance from the display. In some examples, such a plurality of parallax barriers may be active parallax barriers that may be activated or deactivated, depending on whether display of a 2D image or a 3D image is desired.

SUMMARY

This disclosure is directed to techniques for controlling, by a host controller, the presentation 3D images by a display consistent with an orientation for the display. The display includes a first plurality of parallax barriers and a second plurality of parallax barriers arranged perpendicular to the first plurality of parallax barriers. The first and second plurality of parallax barriers may be selectively activated or deactivated such that the display may cause a 3D image to be presented to a viewer.

According to the techniques of this disclosure, in some examples, a host controller may receive an indication of an orientation for the display (e.g., an indication whether the display has a first orientation or a second orientation different than the first orientation). In response to such an indication, the host controller may combine image data sent to the display such that a presented 3D image is consistent with the orientation for the display (e.g., such that the presented image appears substantially 3D to a viewer in an orientation for the display). For example, the host controller may combine first image data corresponding to a right image of the 3D image and second image data corresponding to a left image of the 3D image, such that the combined image data is arranged in a first interleaved format or a second interleaved format, consistent with an orientation for the display (e.g., consistent with an orientation of an activated first or second plurality of parallax barriers of the display).

For example, a method of controlling a display to present a three-dimensional (3D) image is described herein. The method includes receiving, by a host controller, first image data that corresponds to a left image of a three-dimensional (3D) image. The method further includes receiving, by the host controller, second image data that corresponds to a right image of the 3D image. The method further includes combining, by the host controller, the first image data and the second image data in a first interleaved format to generate a first combined image data. The method further includes sending, by the host controller, the first combined image data to control a display to present the 3D image consistent with a first orientation for the display. The method further includes receiving, by the host controller, an indication of a second orientation for the display. The method further includes combining, by the host controller, the first image data and the second image data in a second interleaved format different than the first interleaved format to generate second combined image data in response to the indication of the second orientation for the display. The method further includes sending, by the host controller, the second combined image data to control the display to present the 3D image consistent with the second orientation for the display.

As another example, a host controller device configured to control a display to present a three-dimensional (3D) image is described herein. The host controller device includes an image processing module. The image processing module is configured to receive first image data that corresponds to a left image of a three dimensional image. The image processing module is further configured to receive second image data that corresponds to a right image of the 3D image. The image processing module is further configured to combine the first image data and the second image data in a first interleaved format to generate a first combined image data. The image processing module is further configured to send the first combined image data to control a display to present the 3D image consistent with a first orientation for the display. The image processing module is further configured to receive an indication of a second orientation for the display. The image processing module is further configured to combine the first image data and the second image data in a second interleaved format different than the first interleaved format to generate second combined image data in response to the indication of the second orientation for the display. The image processing module is further configured to send the second combined image data to control the display to present the 3D image consistent with the second orientation for the display.

According to another example, a computer-readable storage medium is described herein. The computer-readable storage medium stores instructions configured to cause a computing device to receive, by a host controller, first image data that corresponds to a left image of a three dimensional (3D) image. The instructions further cause a computing device to receive, by the host controller, second image data that corresponds to a right image of the 3D image. The instructions further cause a computing device to combine, by the host controller, the first image data and the second image data in a first interleaved format to generate a first combined image data. The instructions further cause a computing device to send, by the host controller, the first combined image data to control a display to present the 3D image consistent with a first orientation for the display. The instructions further cause a computing device to receive, by the host controller, an indication of a second orientation for the display. The instructions further cause a computing device to combine, by the host controller, the first image data and the second image data in a second interleaved format different than the first interleaved format to generate second combined image data in response to the indication of the second orientation for the display. The instructions further cause a computing device to send, by the host controller, the second combined image data to control the display to present the 3D image consistent with the second orientation for the display.

According to another example, a host controller device configured to control a display to present a three-dimensional (3D) image is described herein. The host controller device includes means for receiving first image data that corresponds to a left image of a three-dimensional (3D) image. The host controller device further includes means for receiving second image data that corresponds to a right image of the 3D image. The host controller device further includes means for combining the first image data and the second image data in a first interleaved format to generate a first combined image data. The host controller device further includes means for sending the first combined image data to control a display to present the 3D image consistent with a first orientation for the display. The host controller device further includes means for receiving an indication of a second orientation for the display. The host controller device further includes means for combining the first image data and the second image data in a second interleaved format different than the first interleaved format to generate second combined image data in response to the indication of the second orientation for the display. The host controller device further includes means for sending the second combined image data to control the display to present the 3D image consistent with the second orientation for the display.

The details of one or more examples of this disclosure are set forth in the accompanying drawings and the description below. Other features, objects, and advantages of the techniques described herein will be apparent from the description and drawings, and from the claims.

DETAILED DESCRIPTION

This disclosure is directed to techniques for controlling, by a host controller, the presentation of 3D images by a display consistent with an orientation for the display. For example, the host controller may receive an indication of an orientation for the display (e.g., an indication that the display has been physically rotated, or an indication to rotate the 3D image with respect to a physical orientation of the display). In response to such an indication, the host controller may selectively combine left and right image data of the 3D image in a first interleaved format or a second interleaved format, based on an orientation for the display. In this manner, the host controller may control the display to present the 3D image consistent with an orientation for the display (e.g., consistent with an activated first or second plurality of parallax barriers of the display). According to the techniques described herein, in some examples, complexity of one or more components of the display (e.g., one or more display driver ICs) may be reduced. In addition, usage of one or more of processing overhead, power, and/or memory of the display to present the 3D image consistent with the orientation for the display may be reduced, and beneficially used for one or more other purposes.

Figure 1:
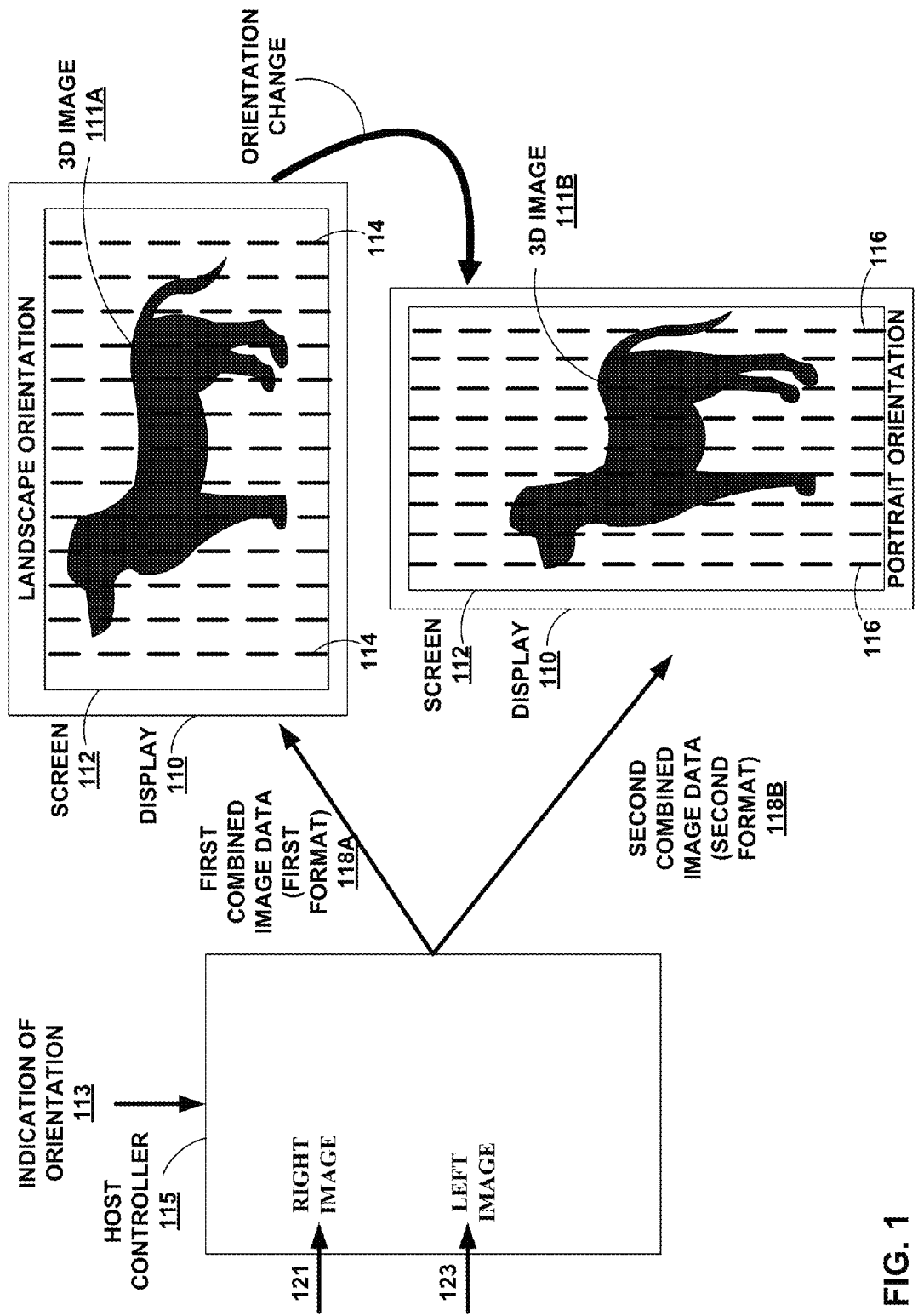
FIG. 1 is a conceptual diagram that illustrates one example of a host controller configured to control a display to present a 3D image based on an orientation for the display consistent with an example of the techniques described herein.

FIG. 1 is a conceptual diagram that depicts one example of a host controller 115 configured to control a display 110 to present a 3D image 111A, 111B consistent with an orientation for the display. For example, according to the example shown in FIG. 1, display 110 may have a first orientation 117A (a landscape physical orientation in the example of FIG. 1), or a second orientation 117B (a portrait physical orientation in the example of FIG. 1) different than the first orientation 117A. FIG. 1 depicts a first orientation 117A, and a second orientation 117B where display 110 has been rotated 90 degrees to the right. In other examples not depicted in FIG. 1, the techniques described herein may be applied for other orientations for display 110, such as rotated 180 or 270 degrees to the right from orientation 117A depicted in FIG. 1. In still other examples not depicted in FIG. 1, the techniques described herein may be applied to a display rotated to the left, such as 90, 180, or 270 degrees to the left from orientation 117A depicted in FIG. 1.

As shown in the example of FIG. 1, display 110 includes a first plurality of parallax barriers 114 (as shown by the dashed lines of display 110 in first orientation 117A) and a second plurality of parallax barriers 116 (as shown by the dashed lines of display 110 in second orientation 117B). As shown in the example of FIG. 1, the first plurality of parallax barriers 114 are arranged perpendicular to the second plurality of parallax barriers 116.

In general, parallax barriers 114, 116 form a series of precision slits at a surface of display 110, and operate to cause respective right and left images of a displayed 3D image to be presented to a viewer's right and left eyes, respectively.

The first plurality of parallax barriers 114 and second plurality of parallax barriers 116 may be selectively activated or deactivated to cause the respective right and left images of 3D image 111A, 111B to be presented to a viewer's right and left eyes, respectively, depending on an orientation for display 110. For example, according to the example of FIG. 1, first plurality of parallax barriers 114 are arranged vertically with respect to a viewer's perspective, and may be activated, when display 110 has first orientation 117A (e.g., a landscape physical orientation), and second plurality of parallax barriers 116 are arranged horizontally with respect to the viewer's perspective, and may be activated, when display 110 has second orientation 117B (e.g., a portrait physical orientation).

Generally speaking, first and second plurality of parallax barriers 114 and 116 may be formed by any structure configured to be selectively activated or deactivated to cause right and left images to be directed to a viewer's right and left eyes. For example, first and second plurality of parallax barriers 114 and/or 116 may comprise ferroelectric liquid crystals or a liquid powder that may be selectively activated (cause 3D image to be presented) or deactivated (cause 2D image to be presented).

According to the example of FIG. 1, display 110 may use active first parallax barriers 114 to present image 111A such that image 111A appears substantially 3D to a viewer when display 110 has first orientation 117A. As also shown in FIG. 1, an orientation of display 110 may be changed from first orientation 117A to second orientation 117B. In response to such a change between orientation 117A and 117B, display 110 may deactivate first plurality of parallax barriers 114, and activate second plurality of parallax barriers 116. In other examples not depicted in FIG. 1, display 110 may present 3D image 111A, 111B in response to a transition from second orientation 117B to first orientation 117A. For example, in response to an indication of a change from second orientation 117B to first orientation 117A, display 110 may deactivate second plurality of parallax barriers 116, and activate first plurality of parallax barriers 114.

According to the techniques of this disclosure, host controller 115 may combine image data consistent with an orientation for display 110 (e.g., consistent with first orientation 117A or second orientation 117B). For example, host controller 115 may receive, from display 110 or elsewhere, an indication of an orientation 113 for display 110. For example, as shown according to the example of FIG. 1, the indication of an orientation 113 may indicate that display 110 has first physical orientation 117A, second orientation 117B, or another orientation not depicted in FIG. 1. According to other examples, host controller may receive an indication 113 that a user desires a second orientation 117B for display 110, or that another orientation for 117B has been automatically determined, such as by one or more software applications executing on host controller 115, or display 110, or another computing device.

Host controller 115 may control display 110 to present 3D image 111A consistent with an orientation 117A for display 110 according to the techniques of this disclosure. For example, if display has first orientation 117A, host controller 115 may combine first image data 121 associated with a right image of 3D image 111A with second image data 123 associated with a left image of 3D image 111A according to a first interleaved format to generate first combined image data 118A, and send first combined image data 118A to display 110. Based on the combined image data 118A, display 110 may present 3D image 111A consistent with first orientation 117A for display 110 (e.g., consistent with first plurality of parallax barriers 114 being activated, and second plurality of parallax barriers 116 being deactivated). The first and second image data 121, 123 may represent a still 3D image, or may represent a 3D video sequence (e.g., a plurality of still 3D images presented in sequence).

According to the example of FIG. 1, in response to an indication 113 that display 110 has second orientation 117B, host controller 110 may combine first image data 121 and second image data 123 to generate second combined image data 118B arranged in a second interleaved format different than the first interleaved format of first combined image data 118A. Based on the combined image data 118B, display 110 may present 3D image 111A consistent with second orientation 117B for display 110 (e.g., consistent with second plurality of parallax barriers 116 being activated, and first plurality of parallax barriers 114 being deactivated).

According to one example, host controller 115 may generate first combined image data 118A to have a pixel-interleaved format, and generate second combined image data 118B to have a line-interleaved format. According to another example, host controller 115 may generate first combined image data 118A to have a line-interleaved format, and generate image data 118B to have a pixel-interleaved format.

According to the techniques of this disclosure, host controller 115 may combine (and/or otherwise process) first image data 121 corresponding to a right image of a 3D image and second image data 123 corresponding to a left image of a 3D image and send the combined image data 118A, 118B to a display 110 consistent with an orientation for the display 110 (e.g., consistent with an activated plurality of parallax barriers 114, 116 of the display). In this manner, the techniques of this disclosure provide for advantages over other techniques for controlling the display of a 3D image consistent with an orientation for the display. For example, according to the techniques described herein, display 110 may not be specifically configured to combine or modify image data in response to a change in orientation for the display. Instead, display 110 may merely receive from host controller combined image data 118A in a first format and/or combined image data 118B in a second format, already processed consistent with an orientation change between first orientation 117A and second orientation 117B of display 110. In this manner, display may receive combined image data 118A, 118B and present the 3D image 111A, 111B in a same way, regardless of whether display 110 has first orientation 117A or second orientation 117B. Accordingly, a complexity of circuitry and/or software (e.g., a display driver IC) of display 110 may be reduced. Also, in some examples, display 110 may rely on a limited power source (e.g., a battery) and/or include less processing power and/or memory than host controller 115. The techniques of this disclosure may be used to reduce an amount of battery power, processing power, memory, and/or other computing resources of display 110 used to present 3D image 111A, 111B consistent with an orientation for display 110. According to these examples, battery power, processing power, memory, and/or other computing resources that may have been used to present 3D image 111A, 111B consistent with an orientation of display 110 may be beneficially used for other purposes.

According to various examples described herein, host controller 115 may comprise any device communicatively coupled to a display 110 configured to present a 3D image 111A, 111B. For example, host controller 115 may include one or more processors associated with one or more of a set-top box, gaming console, mobile phone, smart phone, tablet computer, laptop computer, desktop computer, or any other computing device configured to process first and second image data 121, 123 associated with respective right and left images of 3D image 111A, 111B.

Also according to the various examples described herein, display 110 may include any device that includes a display 110 (e.g., a display screen 112) configured to present 3D image 111A, 111B consistent with the techniques of this disclosure. According to the example of FIG. 1, display includes an active first plurality of parallax barriers 114, and an active second plurality of parallax barriers 116 arranged perpendicular to the first set of parallax barriers 114. In other examples, display 110 may include one or more other mechanisms that enable display 110 to present a 3D image. For example, display 110 may include one or more lenticular lenses or other mechanism that enable display 110 to present a 3D image 111A,111B. For example, display 110 may include one or more of a cathode ray tube (CRT), liquid crystal display (LCD), light emitting diode (LED) display, LED LCD display, organic light emitting diode display, plasma display, or the like. In some examples, such a display may be provided in a dedicated display monitor, a television, a mobile phone, a smart phone, a tablet computer, a laptop computer, a desktop computer, a digital media player, a gaming controller that includes a display, or any other device that includes a display 110 configured to present 3D image 111A, 111B as described herein.

Also, according to the various examples described herein, host controller 115 may be communicatively coupled to display 110, either wired or wirelessly. For example, host controller 115 may be configured to communicate image data 118A, 118B to display 110 via one or more wired communication techniques or interfaces such as HIGH DEFINITION MACHINE INTERFACE (HDMI), DIGITAL VIDEO INTERFACE (DVI), composite video, component video, UNIVERSAL SERIAL BUS (USB) interface), FIREWIRE interface, Ethernet interface, or any other technique for wired communication of image data 118A and modified image data 118B. According to other examples, host controller 115 may be configured to communicate image data 118A and modified image data 118B to display 110 via one or more wireless communication techniques such as BLUETOOTH, WI-FI (e.g., 802.11X), wireless HDMI, and/or a cellular communications interface (e.g., via 3G, 4G cellular communications networks).

As depicted in FIG. 1 and described above, host controller 115 may receive an indication of an orientation 113 for display 110. In some examples, such an indication of an orientation 113 may be received from display 110. For example, display 110 may include one or more sensors (e.g., accelerometer and/or gyroscope) configured to detect a physical orientation of display 110 and/or a change in physical orientation of display 110 (e.g., a user has physically rotated the display from a first physical orientation 117A to second physical orientation 117B as depicted in FIG. 1). According to this example, indication 113 may be received by host controller 115 in response to detection of an orientation of display 110 is held by a user in space (e.g., where display is a handheld device such as a smart phone or tablet computer).

In other examples, the indication of an orientation 113 may be received by host controller 115 in response to detection that a user has modified an orientation of a mounted display (e.g., a television display) secured to a wall, desk, or other structure. Such an indication 113 may be detected by a sensor of the display 110 as described above with respect to a handheld display 110, or may be detected by a mechanical sensor of a mounting device configured to detect relative movement of a mounting member coupled to the display 110.

In still other examples consistent with the techniques of this disclosure, host device 115 may receive an indication of an orientation for display 110 that is not a physical orientation as depicted with respect to the example of FIG. 1. For example, host device 115 may receive an indication to modify an orientation of a displayed 3D image 111A with respect to a fixed physical orientation of display 110. According to these examples, like the example described above with respect to changed physical orientation of display 110, display 110 may be operable to activate and/or deactivate first plurality of parallax barriers 114 or second plurality of parallax barriers 116, such that an image appears substantially 3D to a viewer when the viewer is in different viewing positions.

According to one such an example, host device 115 may receive such an indication of an orientation of an image with respect to a fixed physical orientation of display 110 based on user input (e.g., via display 110, host controller 115, or another input device), or based on one or more sensors or other computing device communicatively coupled to host controller 115). For example, a user may desire to change an orientation of image 111A to such a second orientation with respect to the fixed physical orientation of display 110 when the viewer has transitioned from being in an upright viewpoint (e.g., the viewer is standing or sitting in front of display 110) to a horizontal viewpoint (e.g., the viewer is laying down in front of display 110). Accordingly, host controller 115 may generate combined image data 118A, 118B in response to such an orientation of the viewer with respect to a fixed physical orientation of display 110.

Figure 2:
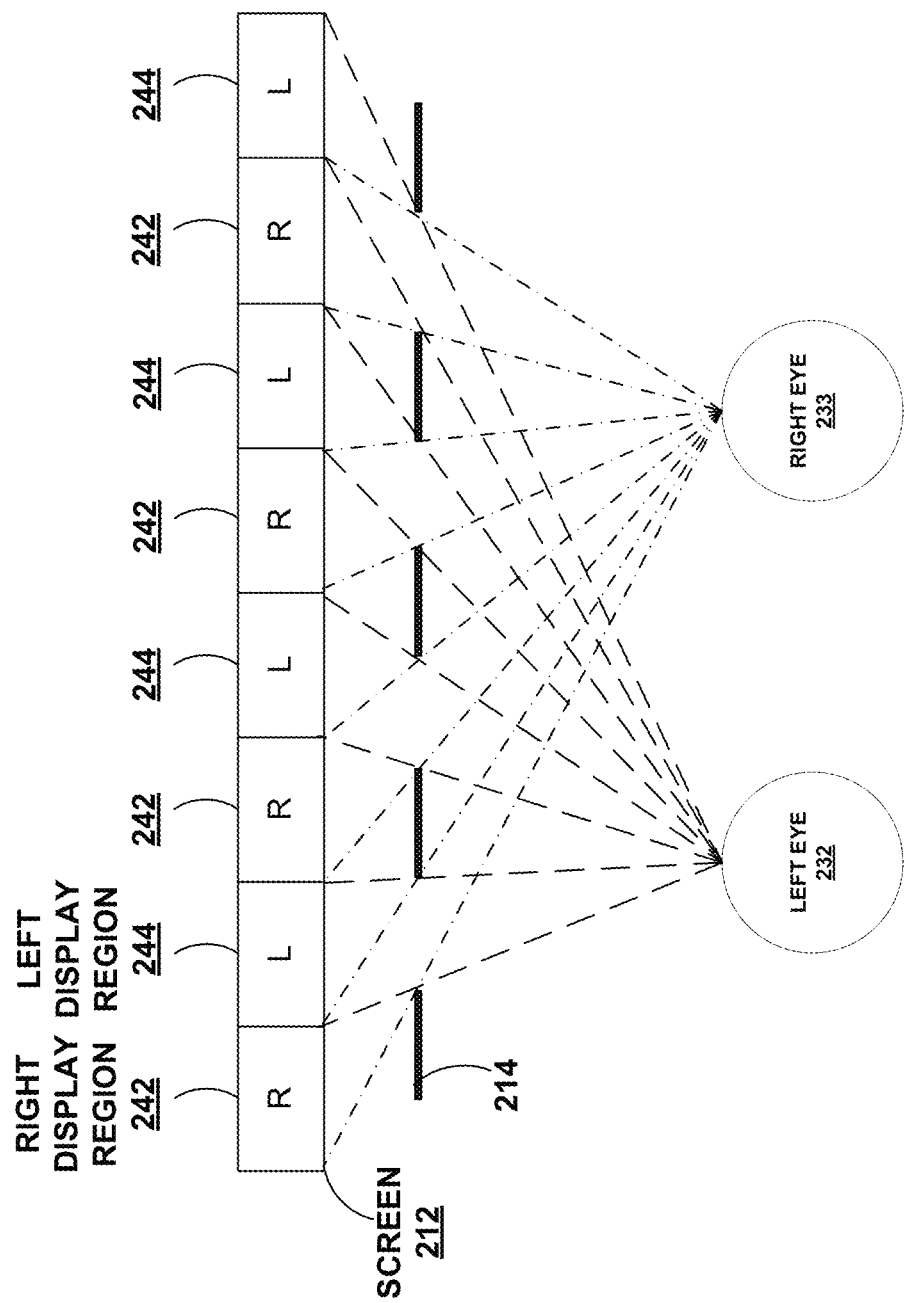
FIG. 2 is a conceptual diagram that illustrates one example of a display screen that includes a plurality of parallax barriers that may be used according to the techniques described herein.

FIG. 2 is a conceptual diagram that illustrates one example of a display 210 that includes a plurality of parallax barriers 214 consistent with the techniques described herein. As shown in the example of FIG. 2, display 210 includes a plurality of parallax barriers 214 at a screen 212 of display 210. The plurality of parallax barriers 214 depicted in FIG. 2 may correspond to either of the first plurality of parallax barriers 114 depicted in FIG. 1, or the second plurality of parallax barriers 116 depicted in FIG. 1.

As shown in FIG. 2, display 210 is configured to present alternating right display regions 242 and left display regions 244 The respective right and left display regions 242, 244 may correspond to lines (e.g., pixel columns) of a displayed image (e.g., lines presented between parallax barriers 114, 116 as depicted in FIG. 1). Right display regions 242 and left display regions 244 may correspond to respective right and left images of a 3D image (e.g., 3D image 111A, 111B depicted in FIG. 1). As depicted in FIG. 2, parallax barriers 214 may operate to cause a viewer to perceive left display regions 244 with the viewer's left eye 232, and cause the viewer to perceive right display regions 242 with the viewer's right eye 233. Based on differences between a right image comprising right display regions 242, and a left image comprising display regions 244, a presented image may appear substantially 3D to a viewer.

As described above, parallax barriers 214 depicted in FIG. 2 may be active parallax barriers that may be selectively activated or deactivated. For example, display 210 may include a first plurality of parallax barriers and a second plurality of parallax barriers arranged perpendicular to the first plurality of parallax barriers. Consistent with the techniques described herein, display 210 may be configured to selectively activate or deactivate the first and/or second plurality of parallax barriers such that a viewer may perceive a displayed image as substantially 3D, for more than one orientation for display 210.

Figure 3:
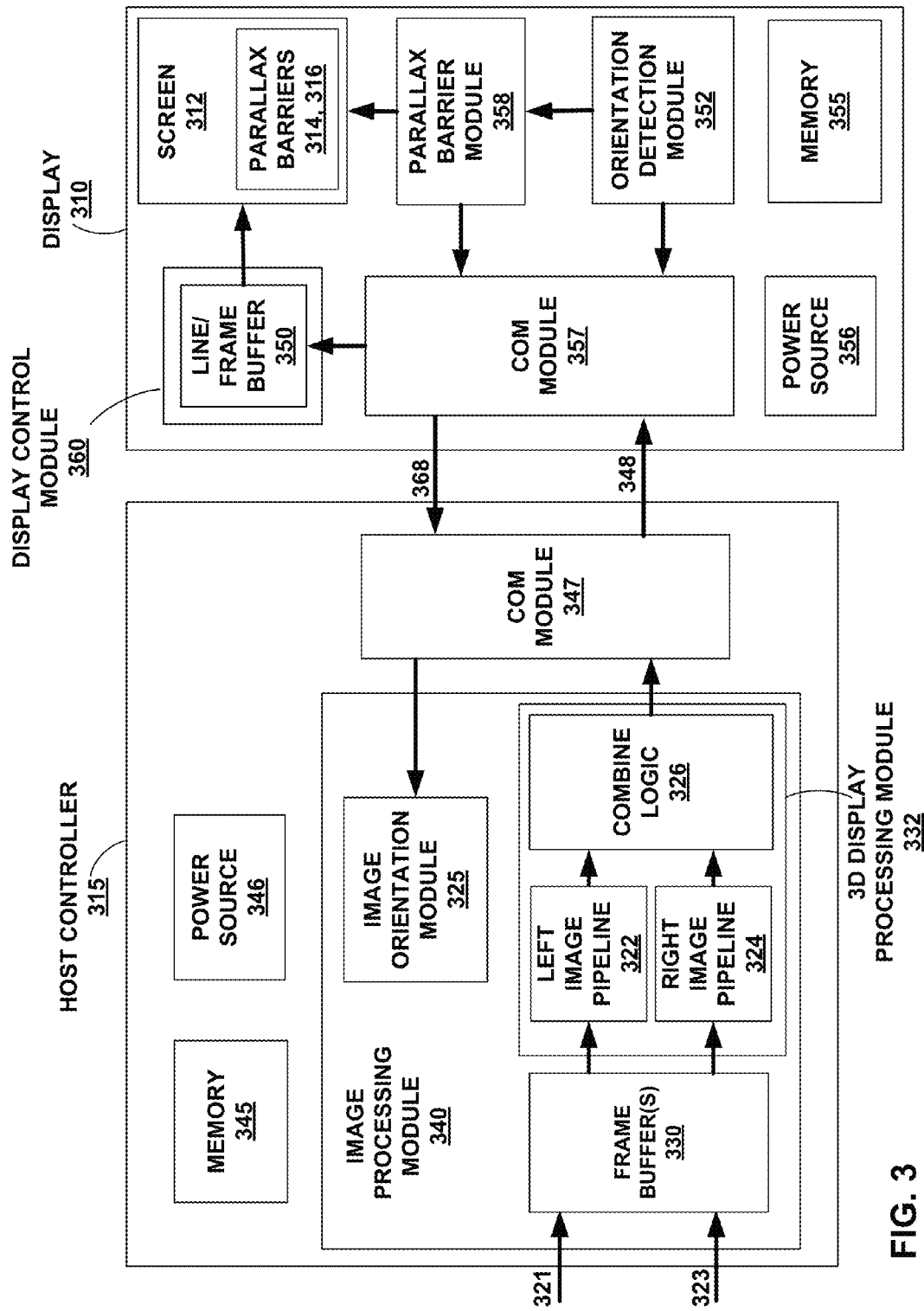
FIG. 3 is a block diagram that illustrates one example of a host controller and a display configured to operate consistent with the techniques described herein.

FIG. 3 is a block diagram that depicts one example of a host controller 315 configured to control the display of 3D images by a display 310 based on an orientation for the display 310 consistent with the techniques described herein. As depicted in FIG. 3, host controller 315 includes an image processing module 340, a memory 345, a power source 346, and a communications module 347 (hereinafter "COM module 347"). As also depicted in FIG. 3, display 310 includes a memory 355, power source 356, and communications module 357 (hereinafter "COM module 357").

In some examples, memory 345 of host controller and/or memory 355 of display 310 may comprise one or more components configured to store data short or long-term, such as a random access memory (RAM) component, a Flash memory component, a magnetic hard disc memory, or any other component configured to store data. In some examples, power source 346 of host controller 315 and/or power source 356 of display 310 may comprise an internal and/or external power source. For example, where host controller 315 and/or display 310 are a mobile device (e.g., a smart phone or tablet computer), power source 346, 356 may comprise a rechargeable battery or other component configured to store electrical energy. However, where host controller 315 and/or display 310 is a non-mobile device such as a desktop computer, host controller 315 and/or display 310 may also or instead be coupled to an external power source such as a standard wall outlet.

COM module 347 of host controller 315 and COM module 357 of display 310 may include any combination of hardware and/or software configured to communicatively couple host controller 315 to display 310. For example, COM module 347 may be configured to interact with communications module 357 (hereinafter COM module 357) of display 310. COM modules 347, 357 may be configured to communicatively couple host controller 315 to display 310 via any wireless or wired communication protocol. For example, COM modules 347, 357 may be configured to communicate with one another via one or more wired communication techniques such as HIGH DEFINITION MACHINE INTERFACE (HDMI), DIGITAL VIDEO INTERFACE (DVI), a composite video, a component video interface, a UNIVERSAL SERIAL BUS (USB) interface), a FIREWIRE interface, an Ethernet interface, or any other technique for wired communication of image data 118A and modified image data 118B. According to other examples, COM modules 347, 357 may be configured to communicate via one or more wireless communication techniques such as BLUETOOTH, WI-FI, wireless HDMI, and/or a cellular communications interface (e.g., via 3G, 4G cellular communications networks).

Image processing module 340 of host controller 315 may comprise any combination of hardware and/or software configured to access and/or generate image data (e.g., data indicating one or more parameters of pixels of a displayed image). For example, image processing module 340 may include a digital signal processor (DSP), central processing unit (CPU), and/or any other hardware and/or software component configured to access and or generate image data.

As depicted in FIG. 3, image processing module 340 includes a 3D display processing module 332, which may be configured to process image data stored in one or more frame buffer(s) 330. Frame buffer(s) 330 may comprise, for example, at least one portion of memory 345. In some examples, frame buffer 330 may be configured to receive and store first image data 321 (e.g., left image data) and second image data 323 (e.g., right image data). First and second image data 321, 323 may be received from any source, whether internal or external to host controller 315. For example, first and second image data 321, 323 may include image data received from a graphics processing unit (GPU, not depicted in FIG. 3) of host controller 315, from image data stored in memory 345, from another computing device via communications module 347, or any other source.

3D display processing module 332 may read first and second image data 321, 323 from frame buffer(s) 330, and process first and second image data 321, 323 for presentation via screen 312. In some examples, 3D display processing module 332 may determine a type of processing performed on left and right images based on an indication of a physical orientation (e.g. portrait or landscape orientation) for display 310.

As shown in the example of FIG. 3, display processing module 332 includes a left image pipeline 322, a right image pipeline 324, and a combine module 326. Left image pipeline 322 may include any hardware and/or software component configured to read and/or process image data for a left image of a 3D image, i.e., a left eye view, as described herein. Right image pipeline 324 may include any hardware and/or software component configured to read and/or process image data for a right image of a 3D image, i.e., a right eye view, as described herein. Combine module 326 may include any hardware and/or software component configured to combine right and left image data for presentation by a 3D display, as described herein.

According to the example of FIG. 3, left image pipeline 332 may read and/or process image data representing a left image of a 3D image (e.g., first image data 321), and right image pipeline 334 may read and or process image data representing a right image of a 3D image. For example, right and left image pipelines 322, 324 may perform one or more of rotation, scaling, filtering, sharpening, color space conversion, gamma correction, picture adjustment, or any other processing of image data 312, 324 that represents respective right and left images. In some examples, a type of processing performed by right and left image pipelines 322, 324 on left and right images may depend on an indication of display orientation received by host controller 315. In some examples, right and left image pipelines 322, 324 may substantially identically process respective right and left image data. As one specific example, in response to detection that an orientation for display 310 has changed by 90 degrees, right and left image pipelines 322, 324 may perform a 90 degree rotation of right and left image data, as well as apply different scaling ratios to the image data. Table 1 below illustrates one example of processing that may be performed on image data in response to detection of an orientation change. Table 1 is provided for exemplary purposes. In other examples, different processing of image data may be performed by host controller 315 in response to determining that an orientation for a display 310 has changed.

TABLE 1

| Source image orientation | Display scan direction | Display orientation | Rotation | Scaling |
|---|---|---|---|---|
| Portrait | Portrait | Portrait | No | Yes |
| Portrait | Portrait | Landscape | –/+90' | Yes |
| Portrait | Landscape | Portrait | –/+90' | Yes |
| Portrait | Landscape | Landscape | No | Yes |
| Landscape | Portrait | Portrait | No | Yes |
| Landscape | Portrait | Landscape | –/+90' | Yes |
| Landscape | Landscape | Portrait | –/+90' | Yes |
| Landscape | Landscape | Landscape | No | Yes |

As shown in Table 1 above, based on a scan direction for display 310, as well as an a determined physical orientation for display 310 and/or an orientation of a source image presented by display 310, host controller 315 may process image data. For example, host controller 315 may or may not rotate image data substantially 90 degrees as shown in Table 1. As also shown in Table 1, in addition to rotating image data, host controller 315 may also scale image data based on a difference between source and destination dimensions, a scan direction and/or a determined physical orientation for display 310 and/or an orientation of a source image presented by display 310.

Table 1 depicts one example of processing that may be performed by host controller 315 in response to a determined 90 degree change in physical orientation for display 310. For example, as shown in Table 1, in response to detecting a 90 degree orientation change, host controller 315 may rotate image data −/+90 degrees. In other examples not depicted in Table 1, host controller 315 may be configured to process image data in response to a 180 degree orientation change for display 310, or any other degree of orientation display change. For example host controller 315 may be configured to rotate the image data −/+180 degrees in response to a 180 degree orientation change.

Combining module 326 may receive right and left image data processed as described above and combine and/or blend the processed respective right and left image to generate combined image data 348 that represents a 3D image. For example, combining module 326 may combine the processed right and left image data to generate line or pixel interleaved combined image data 348 based on an indication of an orientation of display 310 (e.g., screen 312), consistent with one or more aspects of this disclosure.

As depicted in FIG. 3, host controller 315 may send combined image data 348 to display 110. For example, host controller 315 may send combined image data 348 to display 110 via COM module 347. According to this example, display 110 may receive combined image data 348 via COM module 357.

As depicted in FIG. 3, display 310 includes a display control module 360. Display control module 360 may be configured to receive combined image data 348 from host controller 315 (e.g., via COM module 357), and control a screen 312 of the display 310 to present one or more images consistent with the received combined image data 348. For example, display control module 360 may include one or more components configured to cause one or more display elements (e.g., LCD display element, plasma display elements, not shown in FIG. 3) at a surface of the display to emit light of different color, transparency, contrast, frequency, or other property based on combined image data received from host controller 315. As shown in the example of FIG. 3, display control module 360 of display 310 may include one or more line and/or frame buffer(s) 350 (hereinafter line/frame buffer(s) 350, which may include a space associated with one or more lines and/or frames of image data within memory 355). In some examples, display 310 may store received combined image data in line/frame buffer 350. Display control module 360 may read combined image data 348 from line/frame buffer 350 and control the presentation of pixels of screen 312 based on received combined image data 348 from frame buffer 350. As depicted in the example of FIG. 3, display 310 includes an orientation detection module 352 and a parallax barrier module 358. Orientation detection module 352 may include, or be communicatively coupled to, one or more sensors (not shown in FIG. 3) configured to determine an orientation for display 310. For example, orientation detection module 352 may be configured to determine a physical orientation of the display (e.g., whether the display is in a portrait physical orientation or a landscape physical orientation), and/or a degree of the display (e.g. whether the display has been rotated 90, 180, 270, or 360 degrees). To do so, orientation detection module 352 may include or be coupled to one or more of a gyroscope sensor configured to detect an orientation of display with respect to a reference plane (e.g., a reference plane horizontal to a surface of the Earth). According to another example, orientation detection module 352 may also or instead include an accelerometer or gyroscope sensor configured to detect movement and/or force of display to determine an orientation of display 310 (e.g., a change in orientation for display 310). According to still another example, where display 310 is secured to a wall or other structure via a rotatable mechanism, orientation detection module 352 may be communicatively coupled to one or more sensors configured to detect movement of the rotatable mechanism, and thereby determine an orientation of display 310.

Parallax barrier module 358 of display 310 may be configured to receive an indication of orientation for display 310 from orientation detection module 352 (and/or from another computing device or sensor), and selectively activate or deactivate one or more parallax barriers 314, 316 (e.g., parallax barriers 114, 116 depicted in FIG. 1) of screen 312 in response to the received indication. For example, as described above with respect to FIG. 1, display 310 may include a first plurality of parallax barriers 314 (e.g., parallax barriers 114 depicted in FIG. 1), and a second plurality of parallax barriers 316 (e.g., parallax barriers 116 depicted in FIG. 1) arranged perpendicular to the first plurality of parallax barriers.

According to these examples, parallax barrier module 358 may selectively activate or deactivate the first or second plurality 314, 316 of parallax barriers, based on an orientation for display 310. For example, parallax barrier module 358 may activate the first plurality of parallax barriers 314 and deactivate the second plurality of parallax barriers 316 if display 310 has a first orientation (e.g., first orientation 117A depicted in FIG. 1). If display 310 has a second orientation (e.g., second orientation 117B depicted in FIG. 1) different than the first orientation, parallax barrier module 358 may deactivate the first plurality of parallax barriers 314, and activate the second plurality of parallax barriers 316. In this manner, display 310 may be operable to present a 3D image (e.g., 3D image 111A, 111B depicted in FIG. 1) to a viewer in either the first orientation or the second orientation.

In some examples, as depicted in FIG. 3, orientation detection module 352 may also send an indication of a determined orientation 358 for display 310 to host controller 315 (e.g., via COM modules 347, 357). Such an indication 368 may be received by image orientation module 325 of host controller 315. Image orientation module 325 may, according to the techniques described herein, cause image processing module 340 to process and/or combine first image data 321 and second image data 323 differently, dependent on an orientation for display 310.

For example, if display 310 has a first orientation, image orientation module 325 may cause 3D display processing module 332 to process first and second image data 321, 323 based on the first orientation of display 310. For example, right and left image pipelines 322, 324 may read respective right and left image data 321, 323 from frame buffer(s) 330, and scale and/or rotate the right and left image data consistent with the first orientation for display 310. Combine module 326 may combine the rotated and/or scaled right and left image data to generate combined image data 348 that is line or pixel interleaved, consistent with an active plurality of parallax barriers 314, 316 of display 310.

In some examples, in response to an indication 368 that display 310 has a second orientation different than the first orientation, image orientation module 325 may cause 3D display processing module 332 to generate combined image data differently. For example, right and left image pipelines 322, 324 may read respective right and left image data 321, 323 from frame buffer(s) 330, and scale and/or rotate the right and left image data consistent with the determined second orientation for display 310. As one example, right and left image pipelines 322, 324 may rotate image data 90 degrees right or left, consistent with the determined second orientation for display. As another example, right and left image pipelines 322, 324 may scale right and left image data consistent with an orientation of display 310. For example, image pipelines 322, 324 may increase or decrease a number and/or size of rows and/or columns of image pixels of the respective right and left image data.

Combine module 326 may combine the rotated and/or scaled right and left image data to generate combined image data 348 that is line or pixel interleaved, consistent with an active plurality of parallax barriers 314, 316 of display 310. For example, if for the first orientation for display 310, combine module 326 operated to generate combined image data 348 in a line-interleaved format, for the second orientation for display 310, combine module 326 may generate combined image data 348 in a pixel-interleaved format. In this manner, host controller 315 may be configured to process and/or combine respective right and left image data 321, 323 to generate combined image data 348 such that display 310 presents a substantially 3D image, regardless of a physical orientation of display 310.

In some examples, the first interleaved format comprises a line-interleaved format, and the second interleaved format comprises a pixel-interleaved format. According to other examples, the first interleaved format comprises a pixel-interleaved format, and the second interleaved format comprises a line-interleaved format.

By modifying, by image orientation module 325, operation of image processing module 340 of host controller 315 to combine first and second image data 321, 323 in a pixel-interleaved or line-interleaved format as described herein, host controller 315 may send to display 310 image data that corresponds to an orientation for display 310. For example, combined image data 348 sent to display may be consistent with activation of a first plurality of parallax barriers 314 (with second parallax barriers 316 deactivated) or activation of a second plurality of parallax barriers 316 (with first parallax barriers 314 deactivated) of display 310.

In some examples, a scan order of display screen 312 may be different from an orientation of display 310. For example, a scan order of screen 312 may be described as an order in which pixels are shown/drawn on display, which may be in a line by line fashion. For example, for a landscape scan order of screen 312, pixels for each line may be drawn one by one along the longer side of a rectangular screen 312. As another example, for a portrait scan order of screen 312, pixels for each line may be drawn one by one along a shorter side of a rectangular screen 312. Regardless of the scan order, a display panel may be arranged in landscape or portrait physical orientation with respect to a viewer.

In some examples, display 310 may have a predetermined scan order. For example, display 310 may be a landscape scan display or a portrait scan display. According to a landscape scan, display 310 may output lines (e.g., rows) of pixels starting from a top edge of screen 312 to a bottom edge of screen 312, where a length of the top and bottom edges of the screen are greater than a height of screen 312. For example, for each frame of a sequence of images (e.g., a video sequence), a landscape scan display may output lines (e.g., rows) of pixels from top to bottom for a first frame of the sequence, and then output lines (e.g., rows) of pixels from top to bottom for a second frame of the sequence.

According to a portrait scan, display 310 may output lines (e.g., rows) of pixels starting from a top edge of screen 312 to a bottom edge of screen 312, where a length of the top and bottom edges of the screen are less than a height of screen 312.

Figure 4:
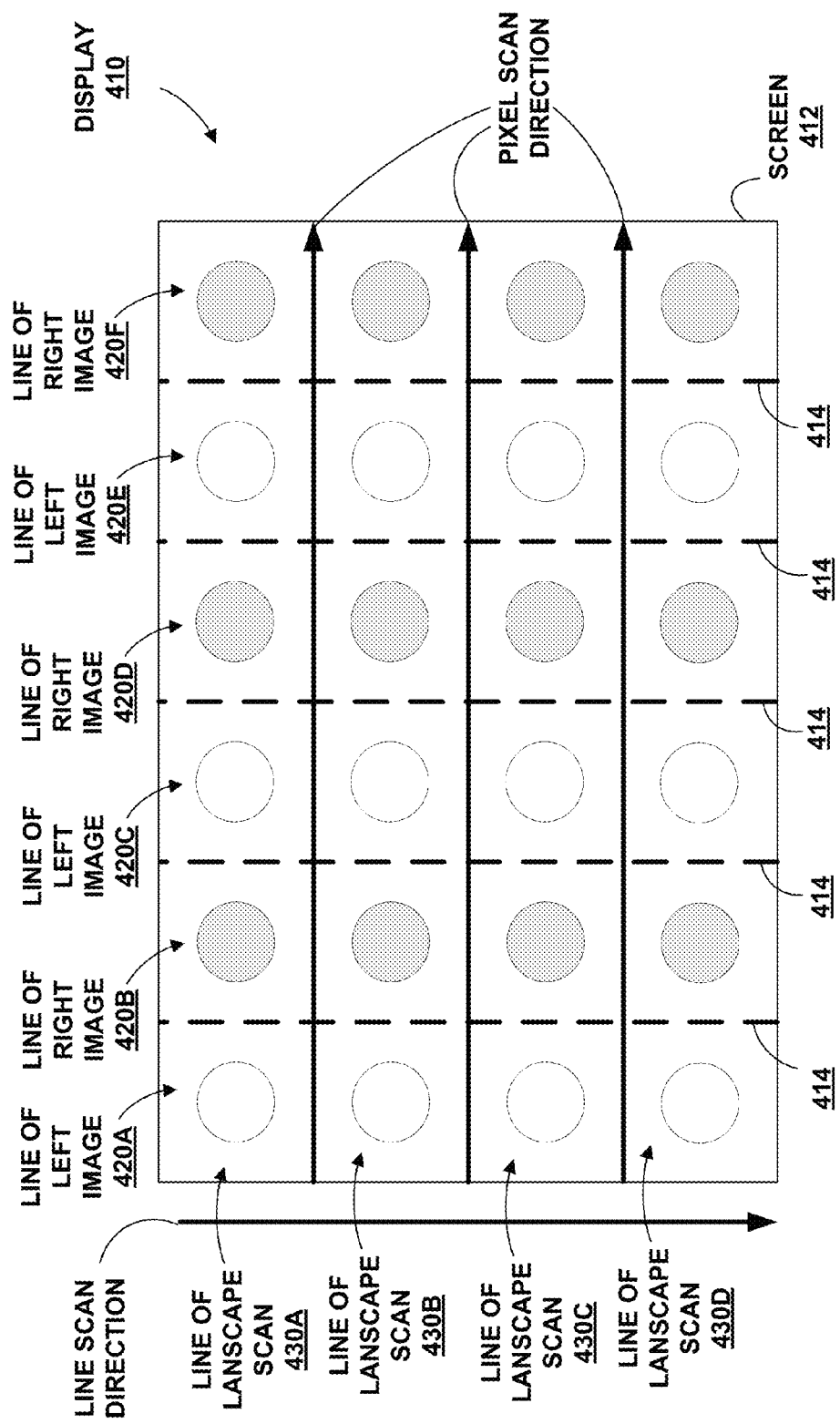
FIGS. 4 and 5 are conceptual diagrams that illustrate a landscape scan display driven by a host controller to present a 3D image based on an orientation for the display consistent with the techniques of this disclosure.
Figure 5:
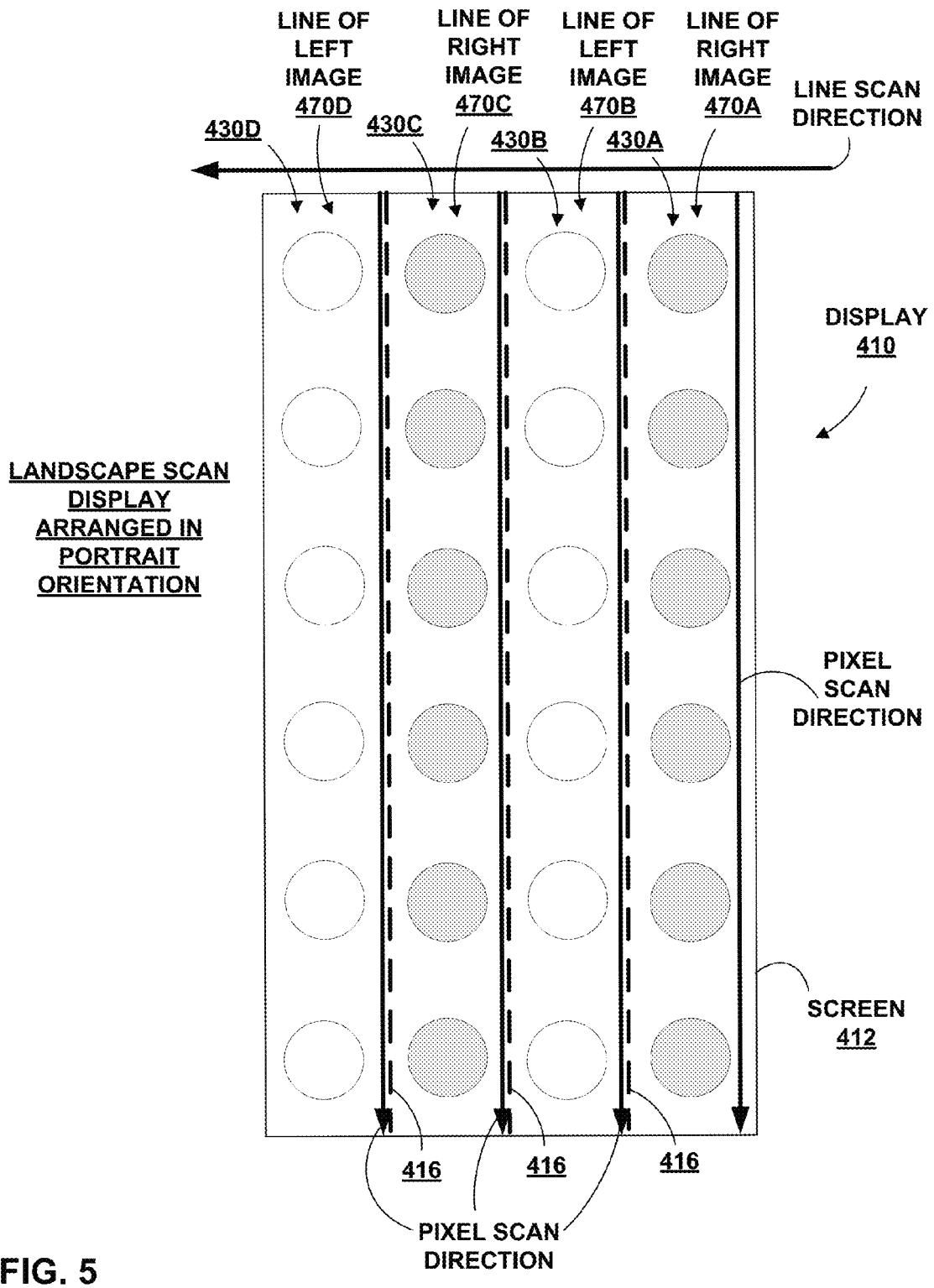
Figure 6:
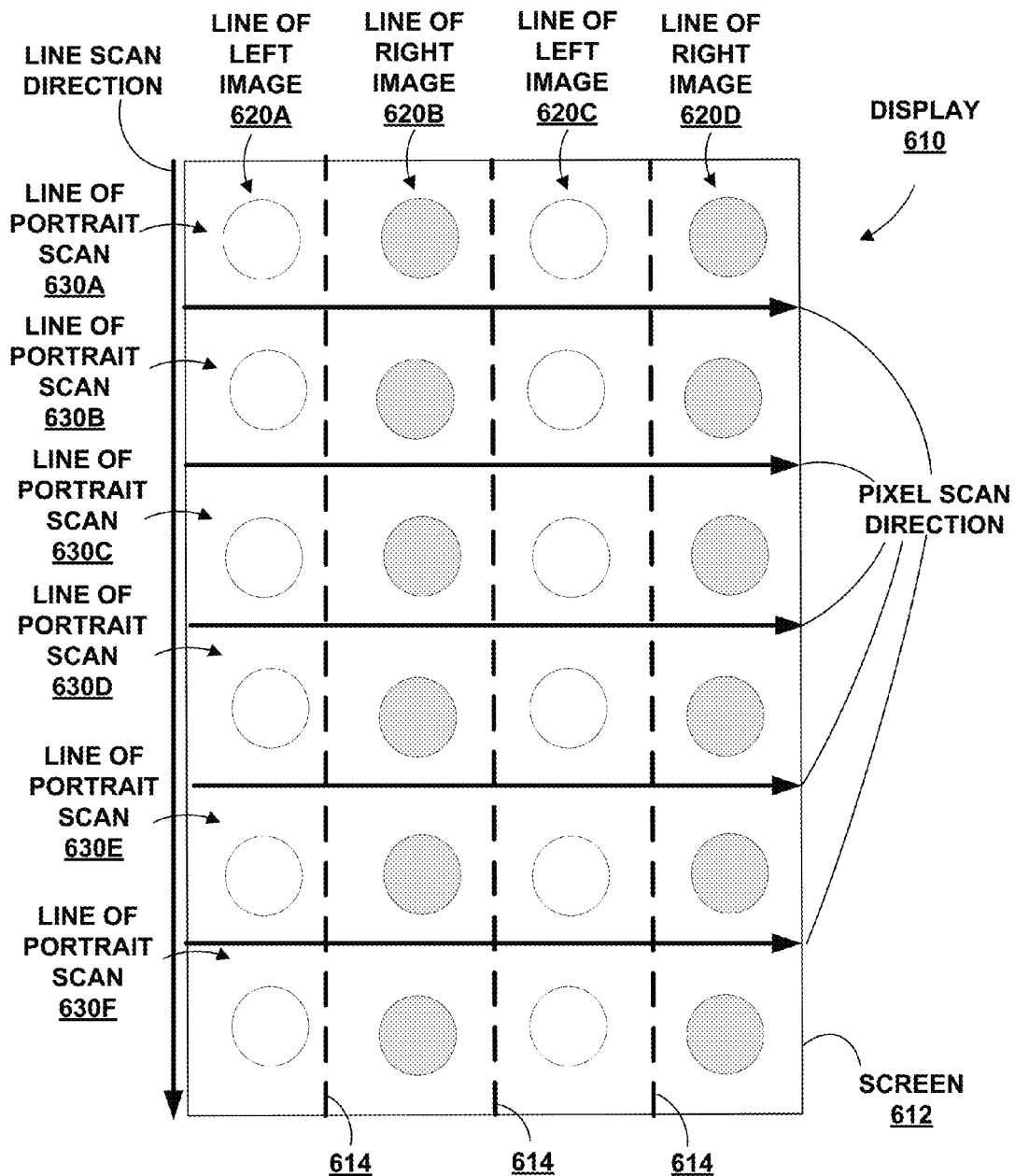
FIGS. 6 and 7 are conceptual diagrams that illustrate a portrait scan display driven by a host controller to present a 3D image based on an orientation for the display consistent with the techniques described herein.
Figure 7:
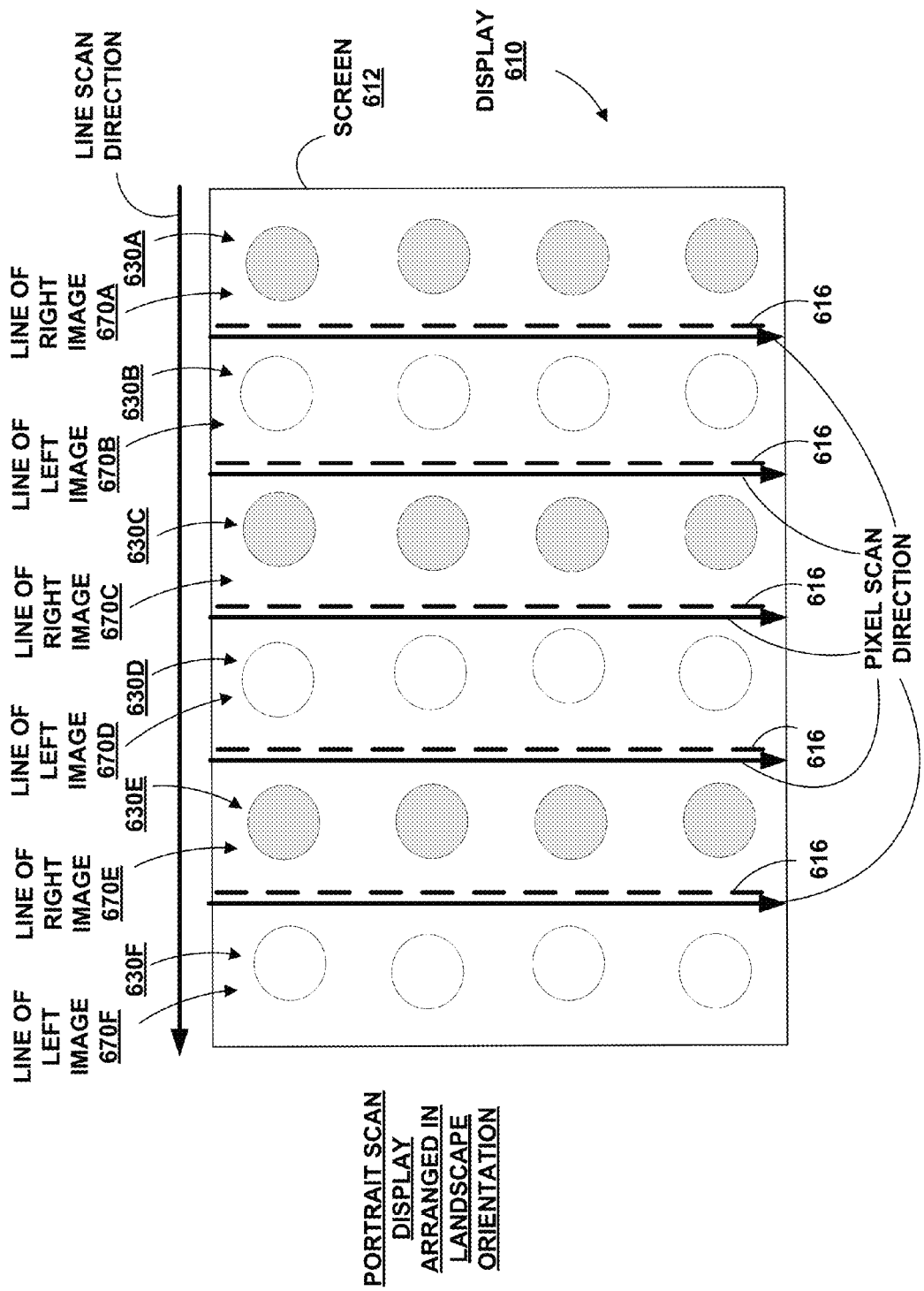

FIGS. 4-7 depict various examples of 3D display screens 410, 610, operative to output a 3D image. FIGS. 4-5 depict displays 410, 610 configured to output a 3D image in landscape scan order. For example FIG. 4 depicts a landscape scan order display 410 arranged in a landscape physical orientation, and FIG. 5 depicts the landscape scan order display 410 arranged in a portrait physical orientation. FIGS. 6-7 depict display 610 configured to output a 3D image in portrait scan order. For example FIG. 6 depicts a portrait scan order display 610 arranged in a portrait physical orientation, and FIG. 7 depicts a portrait scan order display 610 arranged in a landscape physical orientation.

In some examples, for either of a landscape scan or portrait scan display described above, if display 310 has a first orientation, then a scan order of the display (e.g., lines of presented pixels output as described above) may be aligned consistent with an active plurality of parallax barriers as described above. For example, if a landscape scan display is in a portrait physical orientation as depicted in FIG. 5, lines of pixels output according to the landscape scan may align with an active plurality of parallax barriers of the display where line interleaved 3D format would be suitable to present a 3D image using an active plurality of parallax barriers. However, if the landscape scan display is in a landscape orientation as depicted in FIG. 4, lines of pixels output according to the landscape scan may not align to an orientation for the display (i.e., an orientation of an active plurality of parallax barriers). For example, lines of pixels output according to the landscape scan may be perpendicular to an activated plurality of parallax barriers of the display where pixel interleaved 3D format would be suitable to present a 3D image using an active plurality of parallax barriers.

According to another example, if a portrait scan display is arranged in a landscape orientation as depicted in FIG. 7, then lines of pixels output according to the portrait scan may align with activated parallax barriers in the landscape orientation for the display. However, if the portrait scan display is in a portrait orientation as depicted in FIG. 6, lines of pixels output according to the portrait scan may not align with activated parallax barriers in an orientation for the display. For example, lines of pixels output according to the portrait scan may be perpendicular to an activated plurality of parallax barriers of the display.

According to the techniques of this disclosure, image processing module 340 (e.g., 3D display processing module 326) of host controller 315 may process and/or combine first image data 321 that corresponds to a right image of a 3D image and second image data 323 that corresponds to a left image of the 3D image in a first or second interleaved format, dependent on an orientation for the display. According to these techniques, display 310 may not itself be configured to process image data such that the image data is presented consistent with the orientation for the display (e.g., consistent with an activated plurality of parallax barriers of the display). Instead, display 310 may merely receive combined image data from host controller 315, which has already been processed to be consistent with an activated plurality of parallax barriers 314, 316 of display 310. Accordingly, a complexity of display control module 350 (e.g., a complexity of a display driver IC of display 310) may be reduced in comparison to other techniques. Also, one or more of computing, memory, or power resources of display 310 used to present a 3D image may be reduced.

As described above, in some examples, one or more of host controller 315 and/or display 310 may be a mobile device (e.g., smart phone, tablet computer, laptop computer) or other device configured to operate using a limited power source 346, 356. In some examples, display 310 may be configured to operate using a limited power source 356, and host controller 315 may be configured to operate on a less-limited power source 346 (e.g., a larger battery, or direct electrical coupling to a power source, such as an electrical output) than display 310. In some examples, display 310 may also or instead include less processing resources (e.g., a less powerful CPU or GPU), and/or have less available memory 355 than host controller 315. According to these examples, the techniques of this disclosure may provide for further advantages. For example, by processing image data 321, 323 to be consistent with an orientation for display 310 by host controller 315, instead of by display 310 as described herein, an amount of power, memory, and/or computing resources of display 310 used to present a 3D image may be reduced. As such, one or more resources of display 310 may be beneficially used for other purposes.

According to the techniques described herein, host controller 315 may include any device that may control a different device that includes a display 310 configured to present a 3D image. Host controller 315 itself may or may not include a display. For example, display 310 may comprise a television monitor, and host controller 315 may comprise a smart phone, tablet computer, laptop computer, desktop computer, or any other computing device that itself includes a display different than display 310.

As described above, image processing module 340 may process and/or combine received first image data 321 and second image data 323 and generate combined image data 348. In some examples, instead of, or in addition to, sending the combined image data 348 to display 310 for presentation, image processing module 340 may store the combined image data in memory 345 (e.g., one or more frame buffer(s) 330) for later use. For example, image processing module 340 may send the stored combined image data 348 to display 310 via another pipe, such as a (Direct Memory Access) (DMA) pipe (not depicted in the example of FIG. 3).

In some examples, first and second image pipelines 322, 324 may each include their own associated frame-line buffer components. For example, left and right image pipelines 322, 324 may comprise one or more components that include an integrated memory, such as a static random access memory (SRAM) component. In some examples, at least a portion of first image data 321, second image data 323, and/or combined image data may be stored in such an integrated memory component for processing purposes (e.g. one or more of combination, rotation, scaling, filtering, sharpening, color space conversion, gamma correction, picture adjustment, or other processing).

In some examples, image processing module 340 may receive first and second image data 321, 323 by accessing frame buffers 330. According to these examples, left and right image pipelines 322, 324 may read first and second image data 321, 323 in a same way from frame buffer(s), regardless of an orientation for display 310 (e.g., regardless of a received indication of orientation change 368). For example, where left and right image pipelines 322, 324 read first and second image data 321, 323 from frame buffer(s) 330 line by line for a first orientation for display, left and right image pipelines 322, 324 may read first and second image data 321, 323 line by line from frame buffer(s) 330 in response to a second orientation for display. As another example, where left and right image pipelines 322, 324 read first and second image data 321, 323 from frame buffer(s) 330 tile by tile for a first orientation for display, left and right image pipelines 322, 324 may read first and second image data 321, 323 tile by tile from frame buffer(s) 330 in response to a second orientation for display.

In other example, left and right image pipelines 322, 324 may not read image data from frame buffer(s) in a same way from frame buffer(s), regardless of an orientation for display 310. According to these examples, left and right image pipelines 322, 324 read first and second image data 321, 323 from frame buffer(s) 330 line by line for a first orientation for display 310, and in response to an orientation change for display 310, left and right image pipelines 322, 324 read first and second image data 321, 323 from frame buffer(s) 330 tile by tile for a second orientation for display 310.

In some examples, where image processing module 340 reads right and left image data from frame buffer(s) 330 in the same way regardless of an orientation of display 310, as opposed to accessing the respective frame buffers differently (e.g., reading right and left image data pixel by pixel or tile by tile, as opposed to line by line, depending on an orientation for display 310), memory access inefficiencies, which may result from transitioning between reading image data differently, may be reduced. As such, number of page faults experienced when reading image data 321, 323 from frame buffer(s) 330 may be reduced.

In other example, left and right image pipelines 322, 324 may not read image data from frame buffer(s) in a same way from frame buffer(s), regardless of an orientation for display 310. According to these examples, left and right image pipelines 322, 324 read first and second image data 321, 323 from frame buffer(s) 330 line by line for a first orientation for display 310, and in response to an orientation change for display 310, left and right image pipelines 322, 324 read first and second image data 321, 323 from frame buffer(s) 330 tile by tile for a second orientation for display 310. In some examples, transitioning between reading first and second image data 321, 323 from frame buffer(s) 330 line by line to tile by tile or vice versa may improve performance of host controller 315.

FIGS. 4 and 5 are conceptual diagrams of a screen 412 of a landscape scan display 410 configured to output a 3D image, and FIGS. 6-7 are conceptual diagrams of a screen 612 of a portrait scan display 610 configured to output a 3D image. According to the techniques of this disclosure, a host controller 115, 315 may be configured to combine left and right image data to be displayed by the respective display 410, 510 consistent with a first 414, 614 or second 416, 616 plurality of parallax barriers of the displays 410, 610, depicted in FIGS. 4-7. Such combined image data may be received by displays 410, 610, depicted in FIGS. 4-7, to output pixels of one or more images as shown in FIGS. 4-7.

The conceptual diagrams of FIGS. 4-7 are provided for purposes of explaining the techniques described herein, and are intended to be non-limiting. For example, the examples of FIGS. 4-7 depict screens 412, 612 configured to present a relatively small number of pixels and a relatively small number of parallax barriers 414, 416, 614, 616 that operate to direct the pixels of left and right lines of an image to a viewer's respective right and left eyes. In some examples screen 412, 612 may be configured to present an image that includes more or fewer image pixels and parallax barriers 414, 416, 614, 616. According to one such example, a display 410, 610 configured to output image data in a 1080p high-definition format may output 1080 lines of image pixels for a frame of a still image or a frame of video data. According to such an example, display 410 depicted in FIG. 4 may have a width of 1920 pixels and a height of 1080 pixels, and may include up to 1920 first parallax barriers 414 and up to 1080 second parallax barriers 416. According to another example, display 610 depicted in FIG. 6 may have a width of 1080 pixels and a height of 1920 pixels, and may include 1080 first parallax barriers 614 and 1920 second parallax barriers 616. Also according to such examples, where a display is configured to output a 3D image as described herein, half of the 1080 lines of a 1080p high-definition display may be used to present lines of a left image of a 3D image, and the other half of the 1080 lines of the display may be used to present lines of a right image of the 3D image.

Also, as described herein, to present a 3D image a display may be configured to output lines and/or columns of a right image, and lines and/or columns of a left image, such that parallax barriers 414, 416, 614, 616 may cause a presented image to appear substantially 3D to a viewer. In other multi-view 3D examples, a display may be configured to output multiple different left and right images corresponding to same or different 3D image, for example to increase a viewing radius of the display for one or more than one viewer. According to these examples, a host controller 315 may use more than two pipelines (e.g., more than the right and left image pipelines 332, 334 depicted in FIG. 4) to generate combined image data corresponding to multiple right, and multiple left, images of 3D images consistent with the other examples described herein.

FIG. 4 depicts a screen 412 of a landscape scan display 410 arranged in a landscape orientation. When arranged in the landscape orientation depicted in FIG. 4, a width of screen 412 is greater than a height of screen 412.

According to the example of FIG. 4, display 410 is configured to output pixels of image data according to a landscape scan. For example, as shown in FIG. 4, landscape scan display 410 includes a pixel scan direction (from left to right of screen 412), and a line scan direction (from top to bottom of screen 412). According to the landscape scan order of display 410, display 410 may first output a pixel at an upper left-most corner of display 410 (e.g., a first pixel from top of line of left image 420), and then proceed to sequentially output pixels from left to right to a pixel located in an right-most upper corner of the display. As shown in FIG. 4 these pixels, of a top row of the display screen 412, comprise a line 430A of the landscape scan of display 410. As shown in FIG. 4, display 410 may continue to similarly output lines 430B-430D of the landscape scan. In some examples, once pixels of a last line (e.g., line 430D in the example of FIG. 4) of the landscape scan are output, display 410 may return to an upper left-most corner of screen 412, and output lines of a next frame of image data according to the landscape scan depicted in FIG. 4.

As represented by the dashed lines in FIG. 4, screen 412 includes a first plurality of parallax barriers 414. Parallax barriers 414 may generally correspond to parallax barriers 114 depicted in the example of FIG. 1. First set of parallax barriers 414 may be activated when display 410 has a first orientation (e.g., the landscape orientation for display 410 as depicted in FIG. 4), and deactivated when display 410 has a second orientation (e.g., the portrait orientation for display 410 depicted in FIG. 5) different than the first orientation.

According to the example depicted in FIG. 4, screen 412 is operated to use first parallax barriers 414 to cause a presented image to appear substantially 3D to a viewer. As described above with respect to FIG. 2, first parallax barriers 414 may cause a respective right and left image regions of a 3D image presented by a screen 212 to be directed to a viewer's right and left eyes, respectively. For example, parallax barriers 414 depicted in FIG. 4 may cause lines 420A, 420C, and 420E of left image to be directed to a viewer's left eye, and also cause lines 420B, 420D, and 420F of right image to be directed to the viewer's right eye.

According to the example of FIG. 4, where landscape scan display 410 has a landscape orientation, a scan direction for lines of the landscape scan 430A-430D do not correspond to an orientation of first parallax barriers 414. For example, as shown in FIG. 4, lines of landscape scan 430A-430D are arranged perpendicular to first parallax barriers 414.

According to the techniques described herein, host controller 315 may combine image data in a pixel-interleaved format when landscape scan display 410 is arranged in a landscape orientation as depicted in FIG. 4. For example, host controller 315 may combine left and right image data such that lines 430A-430D of the landscape scan are pixel-interleaved (e.g., such that lines 430A-430D each include alternating pixels of left and right images of a 3D image). Accordingly, the left and right lines 420A-420F of a presented 3D image are arranged with a same orientation as first parallax barriers 414. As a result, parallax barriers 414 may cause lines 420A, 420C, and 420E to be directed to a viewer's left eye, and lines 420B, 420D, and 420F to be directed to the viewer's right eye, such that an image presented by display 410 appears substantially 3D to a viewer when display 410 has the landscape orientation depicted in FIG. 4. In some examples, host controller 315 may combine left and right image data differently (e.g., in a line-interleaved format) if landscape scan display 410 has a second orientation different than the landscape orientation depicted in FIG. 4, such as the portrait orientation depicted in FIG. 5.

FIG. 5 is a conceptual diagram that depicts the landscape scan display 410 of FIG. 4 arranged in a portrait orientation (e.g., a portrait physical orientation). For example, as shown in FIG. 5, display 410 is arranged such that a height of screen 412 is greater than a width of screen 412.

According to the example of FIG. 5, display 410 is configured to output pixels of image data according to a landscape scan. For example, according to the portrait orientation depicted in FIG. 5, landscape scan display 410 includes a pixel scan direction (from top to bottom of screen 412), and a line scan direction (from right to left of screen 412). According to the landscape scan of display 410, display 410 may first output a pixel at an upper right-most corner of display 410 (e.g., a first pixel of line 430A), and then proceed to sequentially output pixels from to a pixel located in a lower right-most corner of screen 412 (e.g., a last pixel of line 430A). As shown in FIG. 5 these pixels, of a right-most column of screen 412, comprise a line 430A of the landscape scan of display 410. As shown in FIG. 5, display 410 may continue to similarly output lines 430B-430D of the landscape scan. In some examples, once pixels of a last line (e.g., line 430D in the example of FIG. 4) of the landscape scan are output, display 410 may return to an upper right-most corner of screen 412, and output lines of a next frame of image data according to the landscape scan depicted in FIG. 5.

As represented by the dashed lines in FIG. 5, screen 412 includes a second plurality of parallax barriers 416. Parallax barriers 416 may generally correspond to parallax barriers 116 depicted in the example of FIG. 1. Second plurality of parallax barriers 416 may be activated when display 410 has a second orientation (e.g., the portrait orientation for display 410 as depicted in FIG. 5), and deactivated when display 410 has a first orientation (e.g., the landscape orientation for display 410 depicted in FIG. 4).

According to the example depicted in FIG. 5, screen 412 is operated to use second plurality of parallax barriers 416 to cause a presented image to appear substantially 3D to a viewer. As described above with respect to FIG. 2, second parallax barriers 416 may cause a respective right and left image regions of a 3D image presented by a screen 212 to be directed to a viewer's right and left eyes, respectively. For example, parallax barriers 416 depicted in FIG. 5 may cause lines 470A, 470C of a right image to be directed to a viewer's right eye, and also cause lines 470B, 470D of a left image to be directed to the viewer's left eye.

According to the example of FIG. 5, where landscape scan display 510 has a portrait orientation, a scan direction for lines of the landscape scan 430A-430D correspond to an orientation of second plurality of parallax barriers 416. For example, as shown in FIG. 4, lines 430A-430D of landscape scan are arranged parallel to second plurality of parallax barriers 416, unlike the example of FIG. 4 where lines of the landscape scan 430A-430D are arranged perpendicular to first plurality of parallax barriers 414.

According to the techniques described herein, host controller 315 may combine image data in a line-interleaved format when landscape display 410 is has a portrait orientation as depicted in FIG. 5. For example, host controller 315 may combine left and right image data such that lines 430A-430D each include pixels of a right line 470A, 470C of a right image, or a left line 470B, 470D of a left image. Accordingly, the left and right lines 470A-470D of a presented 3D image are arranged with a same orientation as second parallax barriers 416. As a result, second parallax barriers 416 may cause right lines 470A, 470C to be directed to a viewer's right eye, and lines 470B, 470D to be directed to the viewer's left eye. Due to host controller 315 combining image data (e.g., stored in frame buffer 330 depicted in FIG. 3) to be presented by display 410 as shown in FIG. 5, parallax barriers 416 may cause an image presented by a landscape scan display 410 to appear substantially 3D to a viewer in the portrait orientation depicted in FIG. 5.

FIG. 6 depicts a screen 612 of a portrait scan display 610 arranged in a portrait orientation. In the portrait orientation depicted in FIG. 6, a height of screen 612 is greater than a width of screen 612.

According to the example of FIG. 6, display 610 is configured to output pixels of image data according to a portrait scan. For example, as shown in FIG. 6, portrait scan display 610 includes a pixel scan direction (from left to right of screen 612), and a line scan direction (from top to bottom of screen 612). According to the portrait scan of display 610, display 610 may first output a pixel at an upper left-most corner of display 610 (e.g., a first pixel of line of left image 620), and then proceed to sequentially output pixels from left to right to a pixel located in an right-most upper corner of the display. As shown in FIG. 6 these pixels, of a top row of the display screen 612, comprise a line 630A of the portrait scan of display 610. As shown in FIG. 6, display 610 may continue to similarly output lines 630B-630F of the portrait scan. In some examples, once pixels of a last line (e.g., line 630F in the example of FIG. 6) of the portrait scan are output, display 610 may return to an upper left-most corner of screen 612, and output lines of a next frame of image data according to the portrait scan depicted in FIG. 6.

As represented by the dashed lines in FIG. 6, screen 612 includes a first plurality of parallax barriers 614. First plurality of parallax barriers 614 may be activated when display 610 has a first orientation (e.g., the portrait orientation for display 610 depicted in FIG. 6), and deactivated when display 610 has a second orientation (e.g., the landscape orientation for display 610 depicted in FIG. 7).

According to the example depicted in FIG. 6, screen 612 is operated to use first parallax barriers 614 to cause a presented image to appear substantially 3D to a viewer. As described above with respect to FIG. 2, first parallax barriers 614 may cause respective right and left image regions of a 3D image presented by a screen 212 to be directed to a viewer's right and left eyes, respectively. For example, parallax barriers 614 depicted in FIG. 6 may cause lines 620A, 620C of a left image to be directed to a viewer's left eye, and also cause lines 620B, 620D of a right image to be directed to the viewer's right eye.

According to the example of FIG. 6, where portrait scan display 610 has a portrait orientation, a scan direction for lines of the portrait scan 630A-630F do not correspond to an orientation of first parallax barriers 614. For example, as shown in FIG. 6, lines of portrait scan 630A-630F are arranged perpendicular to first parallax barriers 614.

According to the techniques described herein, host controller 315 may combine image data in a pixel-interleaved format when portrait scan display 610 is has a portrait orientation as depicted in FIG. 7. For example, host controller 315 may combine left and right image data such that lines 630A-630F of the portrait scan are pixel-interleaved (e.g., such that lines 630A-630F each include alternating pixels of left and right images of a 3D image). Accordingly, left and right lines 620A-620D of a presented 3D image are arranged with a same orientation as first parallax barriers 614. As a result, parallax barriers 614 may cause lines 620A, 620C to be directed to a viewer's left eye, and lines 620B, 620D to be directed to the viewer's right eye, such that an image presented by display 610 appears substantially 3D to a viewer when display 610 has the portrait orientation depicted in FIG. 6. In some examples, host controller 315 may combine left and right image data differently (e.g., in a line-interleaved format) if portrait scan display 610 has a second orientation different than the portrait orientation depicted in FIG. 6, such as the landscape orientation depicted in FIG. 7.

FIG. 7 is a conceptual diagram that depicts the portrait scan display 610 of FIG. 6 arranged in a landscape orientation (e.g., a landscape physical orientation). For example, as shown in FIG. 7, display 610 is arranged such that a width of screen 612 is greater than a height of screen 612.

According to the example of FIG. 7, display 610 is configured to output pixels of image data according to a portrait scan. For example, according to the portrait orientation of display 610 depicted in FIG. 7, display 610 includes a pixel scan direction (from top to bottom of screen 612), and a line scan direction (from right to left of screen 612).

According to the portrait scan of display 610, display 610 may first output a pixel at an upper right-most corner of display 610 (e.g., a first pixel of line 630A), and then proceed to sequentially output pixels from a pixel located in a lower right-most corner of screen 612 (e.g., a last pixel of line 430A). As shown in FIG. 7, these pixels, of a right-most column of screen 612, comprise a line 630A of the portrait scan of display 610. As shown in FIG. 7, display 610 may continue to similarly output lines 630B-630F of the portrait scan. In some examples, once pixels of a last line (e.g., line 630F in the example of FIG. 6) of the portrait scan are output, display 610 may return to an upper right-most corner of screen 612, and output lines of a next frame of image data according to the portrait scan depicted in FIG. 7.

As represented by the dashed lines in FIG. 7, screen 612 includes a second plurality of parallax barriers 616. Second plurality of parallax barriers 616 may be activated when display 610 has a second orientation (e.g., the landscape orientation for display 610 as depicted in FIG. 7), and deactivated when display 610 has a first orientation (e.g., the portrait orientation for display 610 depicted in FIG. 6).

According to the example depicted in FIG. 7, screen 612 is operated to use second plurality of parallax barriers 616 to cause a presented image to appear substantially 3D to a viewer. As described above with respect to FIG. 2, first parallax barriers 616 may cause a respective right and left image regions of a 3D image presented by a screen 212 to be directed to a viewer's right and left eyes, respectively. For example, parallax barriers 616 depicted in FIG. 7 may cause lines 670A, 670C, 670E of a right image to be directed to a viewer's right eye, and also cause lines 670B, 670D, 670F of a left image to be directed to the viewer's left eye.

According to the example of FIG. 7, where portrait scan display 610 has a landscape orientation, a scan direction for lines of the portrait scan 630A-630F correspond to an orientation of second plurality of parallax barriers 616. For example, as shown in FIG. 7, lines of portrait scan 630A-630F are arranged parallel to second plurality of parallax barriers 616, unlike the example of FIG. 6, wherein lines of the portrait scan 630A-630D are arranged perpendicular to first plurality of parallax barriers 614.

According to the techniques described herein, host controller 315 may combine image data in a line-interleaved format. For example, host controller 315 may combine left and right image data such that lines 630A-630F each include pixels of a left line 670B, 670D, 670F of a left image, or a right line 670A, 670C, 670E of a right image. Accordingly, the left and right lines 670A-670F of a presented 3D image are arranged with a same orientation as second parallax barriers 616. As a result, parallax barriers 616 may cause right lines 670A, 670C, 670E to be directed to a viewer's right eye, and lines 670B, 670D, 670F to be directed to the viewer's left eye. Due to host controller 315 combining image data (e.g., stored in frame buffer 330 depicted in FIG. 3) to be presented by display 610 as shown in FIG. 7, parallax barriers 616 may cause an image presented by portrait scan display 610 to appear substantially 3D to a viewer in the landscape orientation depicted in FIG. 7.

Figure 8:
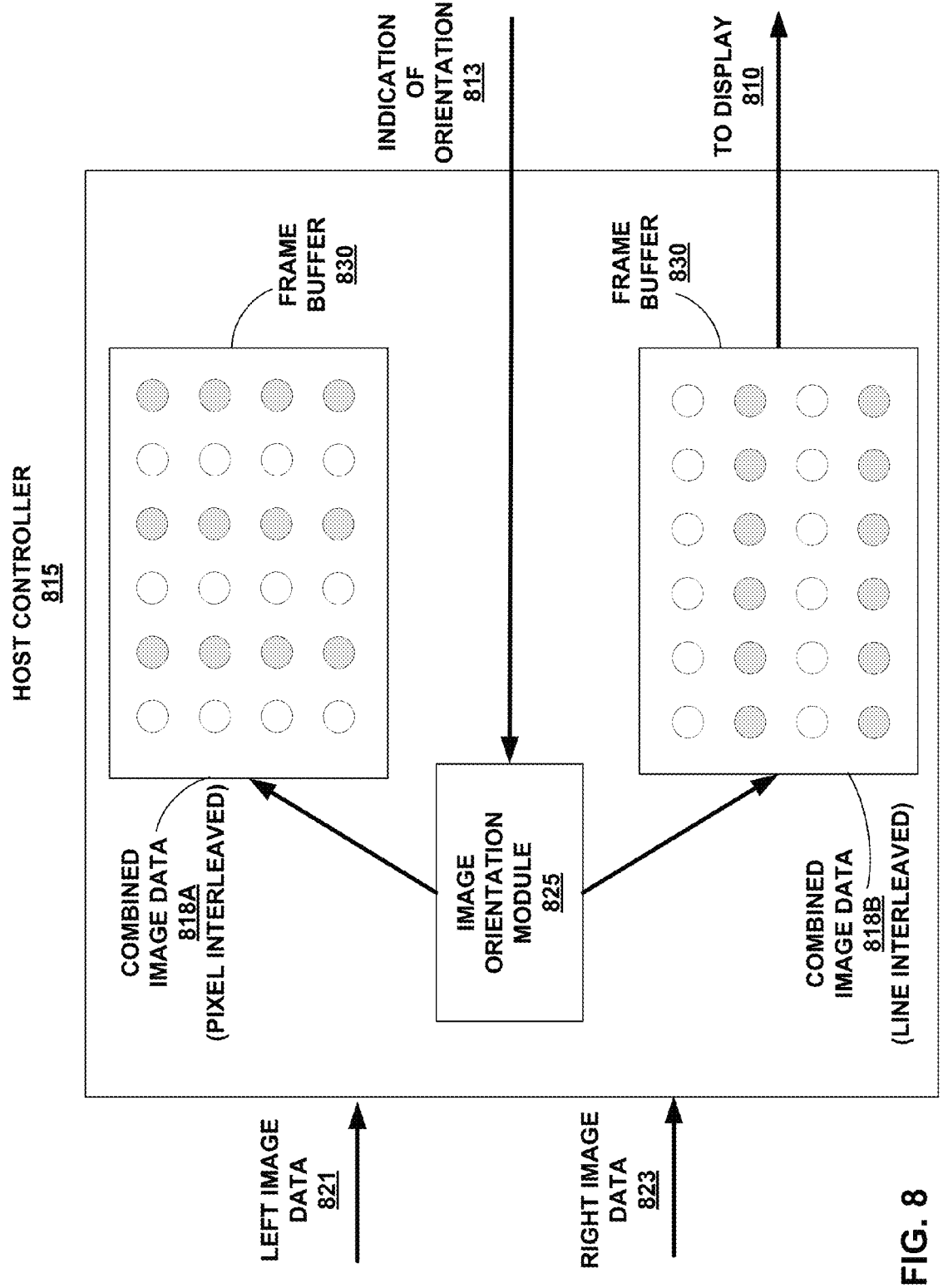
FIG. 8 is a conceptual diagram that illustrates one example of a host controller configured to combine image data according to a first interleaved format or a second interleaved format based on an orientation for a display consistent with the techniques described herein.

FIG. 8 is a conceptual diagram that depicts one example of a host controller 815 configured to combine left image data 821 and right image data 823 of a 3D image consistent with an orientation for a display 810. As shown in FIG. 8, host controller 815 may receive left image data 821 and right image data 823. In some examples, host controller 815 may receive left and right image data 821, 823 from respective left and right image pipelines of host controller 815 (e.g., left and right image pipelines 322, 324 depicted in FIG. 3. In other examples, host controller may receive left and right image data 821, 823 from one or more locations in a memory (e.g., memory 345 depicted in FIG. 3). In still other examples, host controller 815 may receive left and right image data 821, 823 from another computing device (e.g., via communications module 347 depicted in FIG. 3). For example, host controller 815 may receive left and right image data 802, 803 as a video stream from another computing device, e.g., a hypertext transfer protocol (HTTP) server or other type of streaming video server.

In some examples, as host controller 815 receives left image data 821 and right image data 823, host controller 815 may process and/or combine the received image data consistent with an orientation for display 810 (e.g., based on a received indication of orientation 813), and store the processed image data in frame buffer 830. Dependent on the orientation for display 810 (e.g., whether display 810 has been rotated), image orientation module 825 may cause host controller 815 (e.g., 3D display module 332) to process and/or combine received image data in a line-interleaved format, or in a pixel-interleaved format. For example, host controller 815 (e.g., left and right image pipelines 322, 324) may rotate, scale, filter, sharpen, perform color space conversion, perform gamma correction, perform picture adjustment, or any other processing of image data that represents respective right and left images. As another example, host controller 815 (e.g., combine module 326) may combine the respective right and left images. As shown in FIG. 8, host controller 815 may generate combined image data 818A in a pixel-interleaved format. As also shown in FIG. 8, host controller 815 may generate combined image data 818B in frame buffer 830 in a line interleaved format. In some examples, such as shown in FIG. 8, host controller 815 may generate combined image data 818A and/or 818B and store the combined image data in memory, such as one or more frame buffers 330. In other examples, host controller 815 may generate the combined image data 818A and/or 818B and output the combined image data. For example, host controller 815 may output the combined image data to display 310.

As depicted in FIG. 8, host controller 815 may send image data combined in a pixel-interleaved format 818A, or image data combined in a line-interleaved format 818B to display 810. According to the techniques described herein, in response to detection of an orientation change for display 810, display 810 may activate one of a first plurality of parallax barriers (e.g., parallax barriers 114 depicted in FIG. 1) or a second plurality of parallax barriers (e.g., parallax barriers 116 depicted in FIG. 1) and receive combined image data and operate a screen of the display to present images the same as before the orientation for display 810 had changed. In this manner, because host controller 815 combines the left and right image data 821, 823 in a pixel-interleaved or a line-interleaved format as depicted in FIG. 8, display 810 may receive image data and present 3D images consistent with received image data the same, regardless of whether the display is in a first orientation or a second orientation.

Because display 810 receives combined image data and operates a screen of display 810 in the same manner regardless of an orientation for display 810, in some examples a complexity of one or more components (e.g., a display driver IC of display 810) may be reduced. In addition, in some examples, combining image data by a host controller 815 consistent with an orientation for display 810 as described herein may reduce an amount of power, memory, and/or processing resources of display 810 that may be used to present a 3D image consistent with an orientation for display 810. In still other examples, a reliability of memory access when presenting a 3D image consistent with a physical orientation of a display may be improved.

Figure 9:
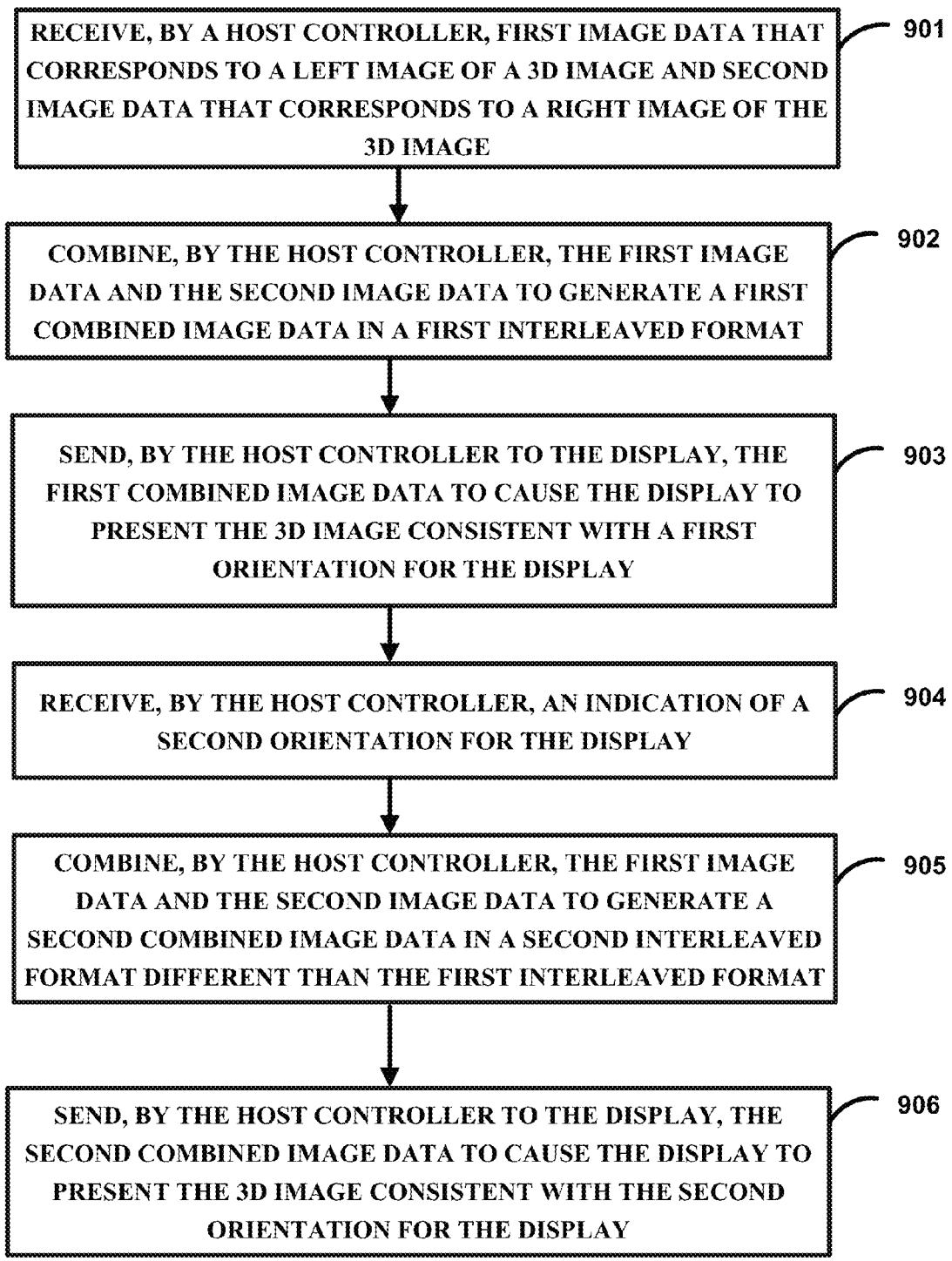
FIG. 9 is a flow diagram that illustrates one example of a method for controlling a display to present a 3D image based on an orientation for the display consistent with the techniques described herein.

FIG. 9 is a flow diagram that illustrates one example of a method for controlling, by a host controller 315, a display 310 to present a 3D image based on an orientation for the display consistent with the techniques described herein. According to the method of FIG. 9, host controller 315 (e.g., 3D display processing module 332 of image processing module 340) receives first image data that corresponds to a left image of a three-dimensional (3D) image, and second image data that corresponds to a right image of the 3D image (901). For example, host controller 315 may receive the first and second image data by accessing a memory 345 (e.g., frame buffer 330) of the host controller 315. Host controller 315 may, in some examples, access the memory 345 line by line or tile by tile, as opposed to pixel by pixel.

As also shown in FIG. 9, host controller 315 (e.g., combining module 326 of image processing module 340) combines the first image data and the second image data in a first interleaved format to generate a first combined image data (902). In some examples, host controller 315 (e.g., right image pipeline 322, left image pipeline 324 of 3D display processing module 332) may also otherwise process the first image data and the second image data. For example, host controller 315 may perform one or more of rotation, scaling, filtering, sharpening, color space conversion, gamma correction, picture adjustment, or any other processing of the first image data and the second image data.

As also depicted in FIG. 9, host controller sends (e.g., via communications module 347), to a display 310, the first combined image data to control the display 310 to present the 3D image consistent with a first orientation for the display 310. For example, host controller 315 may send the combined image data to control the display 310 to present the 3D image consistent with an activated first plurality of parallax barriers 314 of the display 310. The first orientation may comprise a first physical orientation (e.g., a landscape or portrait physical orientation.

As also shown in FIG. 9, host controller 315 may receive an indication of a second orientation for the display 310 (903). According to some examples, the second orientation may comprise a second physical orientation (e.g., landscape or portrait physical orientation) different than the first physical orientation.

As also shown in FIG. 9, host controller 315 (e.g., combining module 326 of image processing module 340) may combine the first image data and the second image data in a second interleaved format different than the first interleaved format to generate second combined image data in response to the indication of the second orientation for the display 310 (904). In some examples, host controller 315 (e.g., right image pipeline 322, left image pipeline 324 of 3D display processing module 332) may also otherwise process the first image data and the second image data. For example, host controller 315 may perform one or more of rotation, scaling, filtering, sharpening, color space conversion, gamma correction, picture adjustment, or any other processing of the first image data and the second image data in response to the indication of the second orientation for the display 310. In some examples, the first interleaved format comprises a line-interleaved format, and the second interleaved format comprises a pixel-interleaved format. In other examples, the first interleaved format comprises a pixel-interleaved format, and the second interleaved format comprises a line-interleaved format.

As also shown in FIG. 9, host controller 315 sends, to the display 310, the second combined image data to control the display 310 to present the 3D image consistent with the second orientation for the display. For example, the second combined image data may cause the display 310 to present the 3D image consistent with an activated second plurality of parallax barriers 316 of the display 310. In some examples, where the 3D image comprises a 3D video sequence, host controller 315 may continue to send, to the display 310, the first or second combined image data for each frame of the video sequence, depending on whether the display 310 has the first orientation or the second orientation.

The techniques described herein may be implemented in hardware, software, firmware, or any combination thereof. Any features described as modules or components may also be implemented together in an integrated logic device or separately as discrete but interoperable logic devices. If implemented in software, the techniques may be realized at least in part by a tangible computer-readable storage medium comprising instructions that, when executed, performs one or more of the methods described above. The tangible computer-readable data storage medium may form part of a computer program product, which may include packaging materials.

The tangible computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements.

Various examples have been described. These and other examples are within the scope of the following claims.

The invention claimed is:

1. A method of controlling a display to present a three-dimensional (3D) image, comprising:
  receiving, by a host controller, first image data that corresponds to a left image of a three-dimensional (3D) image;
  receiving, by the host controller, second image data that corresponds to a right image of the 3D image;
  combining, by the host controller, the first image data and the second image data in a first interleaved format to generate a first combined image data;
  sending, by a communication module of the host controller, the first combined image data to a communication module of a control module of the display to present the 3D image at the display consistent with a first orientation for the display, wherein for the first interleaved format and for the first orientation for the display, lines of a left image of the first combined image data and lines of a right image of the first combined image data are perpendicular to a pixel scan direction for the first orientation and parallel to a line scan direction for the first orientation;
  receiving, by the host controller, an indication of a second orientation for the display;
  combining, by the host controller, the first image data and the second image data in a second interleaved format different than the first interleaved format to generate second combined image data in response to the indication of the second orientation for the display, wherein for the second interleaved format and for the second orientation for the display, lines of a left image for the second combined image data and lines of a right image of the second combined image data are parallel to a pixel scan direction for the second orientation and perpendicular to a line scan direction for the first orientation; and sending, by the host controller, the second combined image data to the control module of the display to present the 3D image at the display consistent with the second orientation for the display.

2. The method of claim 1, wherein the host controller comprises a first device, and wherein the display comprises a second device different than the first device.

3. The method of claim 1, wherein the first image data and the second image data are received from another device communicatively coupled to the host controller.

4. The method of claim 1, wherein receiving, by the host controller, the first image data comprises accessing the first image data from a memory of the host controller, and wherein receiving, by the host controller, the second image data comprises accessing the second image data from the memory of the host controller.

5. The method of claim 4, wherein the memory of the host controller comprises at least one frame buffer of the host controller, and wherein accessing the first image data and accessing the second image data comprises accessing the first image data and the second image data line by line or tile by tile from the at least one frame buffer.

6. The method of claim 5, further comprising:
accessing the first and second image data line by line regardless of whether the display has the first orientation or the second orientation.

7. The method of claim 6, further comprising:
accessing the first and second image data tile by tile regardless of whether the display has the first orientation or the second orientation.

8. The method of claim 1, wherein the first orientation for the display comprises a first physical orientation for the display, and wherein the second orientation for the display comprises a second physical orientation of the display different than the first physical orientation of the display.

9. The method of claim 1, further comprising:
receiving the indication of the second orientation for the display from the display.

10. The method of claim 1, further comprising:
receiving the indication of the second orientation for the display based on user input.

11. The method of claim 1, further comprising:
receiving the indication of the second orientation for the display from at least one sensor of another computing device different than the host controller and the display.

12. The method of claim 1, further comprising:
performing, by the host controller, one or more of rotation, scaling, filtering, sharpening, color space conversion, gamma correction, and picture adjustment of the second combined image data in response to the indication of the second orientation for the display.

13. The method of claim 1, wherein combining, by the host controller, the first image data and the second image data in the first interleaved format to generate the first combined image data comprises combining the first image data and the second image data consistent with a first plurality of parallax barriers activated in response to the first orientation for the display, wherein the first plurality of parallax barriers are perpendicular to the pixel scan direction for the first orientation; and wherein combining, by the host controller, the first image data and the second image data in the second interleaved format to generate the second combined image data comprises combining the first image data and the second image data consistent with a second plurality of parallax barriers activated in response to the second orientation for the display, wherein the second plurality of parallax barriers are parallel to the pixel scan direction for the second orientation.

14. The method of claim 1, wherein the first orientation for the display comprises one of portrait or landscape, the scan direction for the display comprises the one of portrait or landscape, and the second orientation comprises the other of portrait or landscape.

15. The method of claim 1, wherein a line of scanned pixels for the first interleaved format comprises pixels from both the left image of the first combined image data and the right image of the first combined image data, and wherein a line of scanned pixels for the second interleaved format comprises pixels of only the left image or only the right image.

16. A host controller device configured to control a display to present a three-dimensional (3D) image, the device comprising:
a first communication module; and
an image processing module configured to:
receive first image data that corresponds to a left image of a three dimensional (3D) image;
receive second image data that corresponds to a right image of the 3D image;
combine the first image data and the second image data in a first interleaved format to generate a first combined image data;
send, via the first communication module, the first combined image data to a second communication module of a control module of a display to present the 3D image at the display consistent with a first orientation for the display, wherein for the first interleaved format and for the first orientation for the display, lines of a left image of the first combined image data and lines of a right image of the first combined image data are perpendicular to a pixel scan direction for the first orientation and parallel to a line scan direction for the first orientation;
receive an indication of a second orientation for the display;
combine the first image data and the second image data in a second interleaved format different than the first interleaved format to generate second combined image data in response to the indication of the second orientation for the display, wherein for the second interleaved format and for the second orientation for the display, lines of a left image for the second combined image data and lines of a right image of the second combined image data are parallel to a pixel scan direction for the second orientation and perpendicular to a line scan direction for the first orientation; and
send the second combined image data to the control module of the display to present the 3D image at the display consistent with the second orientation for the display.

17. The device of claim 16, wherein the host controller device comprises a first device, and wherein the display comprises a second device different than the first device.

18. The device of claim 16, wherein the first orientation for the display comprises a first physical orientation for the display, and wherein the second orientation for the display comprises a second physical orientation of the display different than the first physical orientation of the display.

19. The device of claim 16, wherein the image processing module is configured to combine the first image data and the second image data in the first interleaved format to generate the first combined image data consistent with a first plurality of parallax barriers activated in response to the first orientation for the display, wherein the first plurality of parallax barriers are perpendicular to the pixel scan direction for the first orientation; and
wherein the image processing module is configured to combine the first image data and the second image data in the second interleaved format to generate the second combined image data consistent with a second plurality of parallax barriers activated in response to the second orientation for the display, wherein the second plurality of parallax barriers are parallel to the pixel scan direction for the second orientation.

20. The device of claim 16, wherein the first orientation for the display comprises one of portrait or landscape, the scan direction for the display comprises the one of portrait or landscape, and the second orientation comprises the other of portrait or landscape.

21. The device of claim 16, wherein a line of scanned pixels for the first interleaved format comprises pixels from both the left image of the second combined image data and the right image of the second combined image data, and wherein a line of scanned pixels for the second interleaved format comprises pixels of only the left image or only the right image.

22. A non-transitory computer-readable storage medium that stores instructions configured to cause a computing device to:
receive, by a host controller, first image data that corresponds to a left image of a three dimensional (3D) image;
receive, by the host controller, second image data that corresponds to a right image of the 3D image;
combine, by the host controller, the first image data and the second image data in a first interleaved format to generate a first combined image data;
send, by a communication module of the host controller, the first combined image data to a communication module of a control module of a display to present the 3D image at the display consistent with a first orientation for the display, wherein for the first interleaved format and for the first orientation for the display, lines of a left image of the first combined image data and lines of a right image of the first combined image data are perpendicular to a pixel scan direction for the first orientation and parallel to a line scan direction for the first orientation;
receive, by the host controller, an indication of a second orientation for the display;
combine, by the host controller, the first image data and the second image data in a second interleaved format different than the first interleaved format to generate second combined image data in response to the indication of the second orientation for the display, wherein for the second interleaved format and for the second orientation for the display, lines of a left image for the second combined image data and lines of a right image of the second combined image data are parallel to a pixel scan direction for the second orientation and perpendicular to a line scan direction for the first orientation; and
send, by the host controller, the second combined image data to the control module of the display to present the 3D image at the display consistent with the second orientation for the display.

23. The non-transitory computer-readable storage medium of claim 22, wherein the host controller device comprises a first device, and wherein the display comprises a second device different than the first device.

24. The non-transitory computer-readable storage medium of claim 22, wherein the first orientation for the display comprises a first physical orientation for the display, and wherein the second orientation for the display comprises a second physical orientation of the display different than the first physical orientation of the display.

25. The non-transitory computer-readable storage medium of claim 22, wherein the image processing module is configured to combine the first image data and the second image data in the first interleaved format to generate the first combined image data consistent with a first plurality of parallax barriers activated in response to the first orientation for the display, wherein the first plurality of parallax barriers are perpendicular to the pixel scan direction for the first orientation; and
wherein the image processing module is configured to combine the first image data and the second image data in the second interleaved format to generate the second combined image data consistent with a second plurality of parallax barriers activated in response to the second orientation for the display, wherein the second plurality of parallax barriers are parallel to the pixel scan direction for the second orientation.

26. A host controller device configured to control a display to present a three-dimensional (3D) image, comprising:
means for receiving first image data that corresponds to a left image of a three-dimensional (3D) image;
means for receiving second image data that corresponds to a right image of the 3D image;
means for combining the first image data and the second image data in a first interleaved format to generate a first combined image data;
means for sending, via a communication module of the host controller, the first combined image data to a communication module of a control module of a display to present the 3D image at the display consistent with a first orientation for the display, wherein for the first interleaved format and for the first orientation for the display, lines of a left image of the first combined image data and lines of a right image of the first combined image data are perpendicular to a pixel scan direction for the first orientation and parallel to a line scan direction for the first orientation;
means for receiving an indication of a second orientation for the display;
means for combining the first image data and the second image data in a second interleaved format different than the first interleaved format to generate second combined image data in response to the indication of the second orientation for the display, wherein for the second interleaved format and for the second orientation for the display, lines of a left image for the second combined image data and lines of a right image of the second combined image data are parallel to a pixel scan direction for the second orientation and perpendicular to a line scan direction for the first orientation; and means for sending the second combined image data to the control module of the display to present the 3D image at the display consistent with the second orientation for the display.

27. The device of claim 26, wherein the host controller device comprises a first device, and wherein the display comprises a second device different than the first device.

28. The device of claim 26, wherein the first orientation for the display comprises a first physical orientation for the display, and wherein the second orientation for the display comprises a second physical orientation of the display different than the first physical orientation of the display.

29. The device of claim 26, further comprising:

means for combining the first image data and the second image data in the first interleaved format to generate the first combined image data consistent with a first plurality of parallax barriers activated in response to the first orientation for the display, wherein the first plurality of parallax barriers are perpendicular to the pixel scan direction for the first orientation; and means for combining the first image data and the second image data in the second interleaved format to generate the second combined image data consistent with a second plurality of parallax barriers activated in response to the second orientation for the display, wherein the second plurality of parallax barriers are parallel to the pixel scan direction for the second orientation.

* * * * *